United States Patent [19]

Tai et al.

[11] Patent Number: 5,356,979
[45] Date of Patent: Oct. 18, 1994

[54] COATING RESIN AND ANTIFOULING COATING COMPOSITION

[75] Inventors: Seiji Tai, Hitachi; Hisanori Takusari, Ibaraki; Hiroyuki Tanaka, Hitachi; Isamu Moribe, Tokushima; Chie Ohdoi, Kanazawa, all of Japan

[73] Assignee: Hitachi Chemical Company, Ltd., Tokyo, Japan

[21] Appl. No.: 996,134

[22] Filed: Dec. 23, 1992

[30] Foreign Application Priority Data

| Dec. 25, 1991 | [JP] | Japan | 3-343331 |
| Feb. 26, 1992 | [JP] | Japan | 4-039355 |
| Feb. 28, 1992 | [JP] | Japan | 4-043085 |
| Mar. 3, 1992 | [JP] | Japan | 4-045009 |
| Mar. 3, 1992 | [JP] | Japan | 4-045010 |
| Mar. 3, 1992 | [JP] | Japan | 4-045011 |
| May 11, 1992 | [JP] | Japan | 4-117362 |
| Jun. 25, 1992 | [JP] | Japan | 4-167456 |
| Jul. 2, 1992 | [JP] | Japan | 4-175253 |
| Nov. 2, 1992 | [JP] | Japan | 4-294293 |

[51] Int. Cl.$^5$ .............. C08K 3/10; C08L 33/00; C08F 118/00; C09J 4/00

[52] U.S. Cl. .............. 524/401; 524/406; 524/413; 524/414; 524/418; 524/431; 524/432; 524/556; 524/558; 526/319; 526/328.5; 526/329.7; 523/122; 523/177

[58] Field of Search .............. 523/177, 122; 524/555, 524/556, 558, 561, 401, 406, 413, 414, 418, 431, 432; 526/256, 259, 262, 263, 328, 328.5, 329, 329.6, 329.7

[56] References Cited

U.S. PATENT DOCUMENTS

| 3,912,682 | 10/1975 | Tucker | 526/263 |
| 3,956,216 | 5/1976 | Tucker | 526/263 |
| 4,593,055 | 6/1986 | Gitlitz et al. | 523/122 |
| 4,594,365 | 6/1986 | Russell et al. | 523/122 |
| 4,687,792 | 8/1987 | Russell et al. | 523/177 |

FOREIGN PATENT DOCUMENTS

| 0169334 | 1/1986 | European Pat. Off. |
| 0322188 | 6/1989 | European Pat. Off. |
| 496472 | 7/1992 | European Pat. Off. |
| 2374390 | 7/1978 | France |
| 2557585 | 7/1985 | France |
| 2160258 | 6/1990 | Japan |
| 3157460 | 7/1991 | Japan |
| 84/02915 | 2/1984 | World Int. Prop. O. |
| 86/02660 | 9/1986 | World Int. Prop. O. |

Primary Examiner—Paul R. Michl
Assistant Examiner—Tae H. Yoon
Attorney, Agent, or Firm—Antonelli, Terry, Stout & Kraus

[57] ABSTRACT

A coating resin comprising a polymer obtained by polymerizing an unsaturated monomer represented by the formula (I):

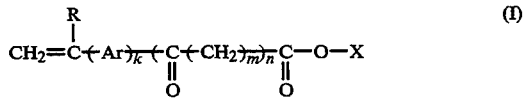

wherein R is H or an alkyl group, and X is selected from:

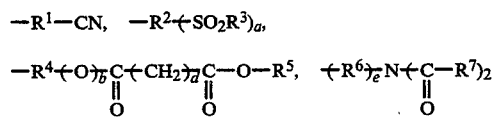

wherein $R^1$ to $R^8$ represent independently a hydrocarbon group, etc., and Py is a pyridyl group, alone or together with one or more other unsaturated monomers can give an antifouling coating composition having no safety problem, good storage stability and excellent antifouling effect for a long period of time.

9 Claims, 21 Drawing Sheets

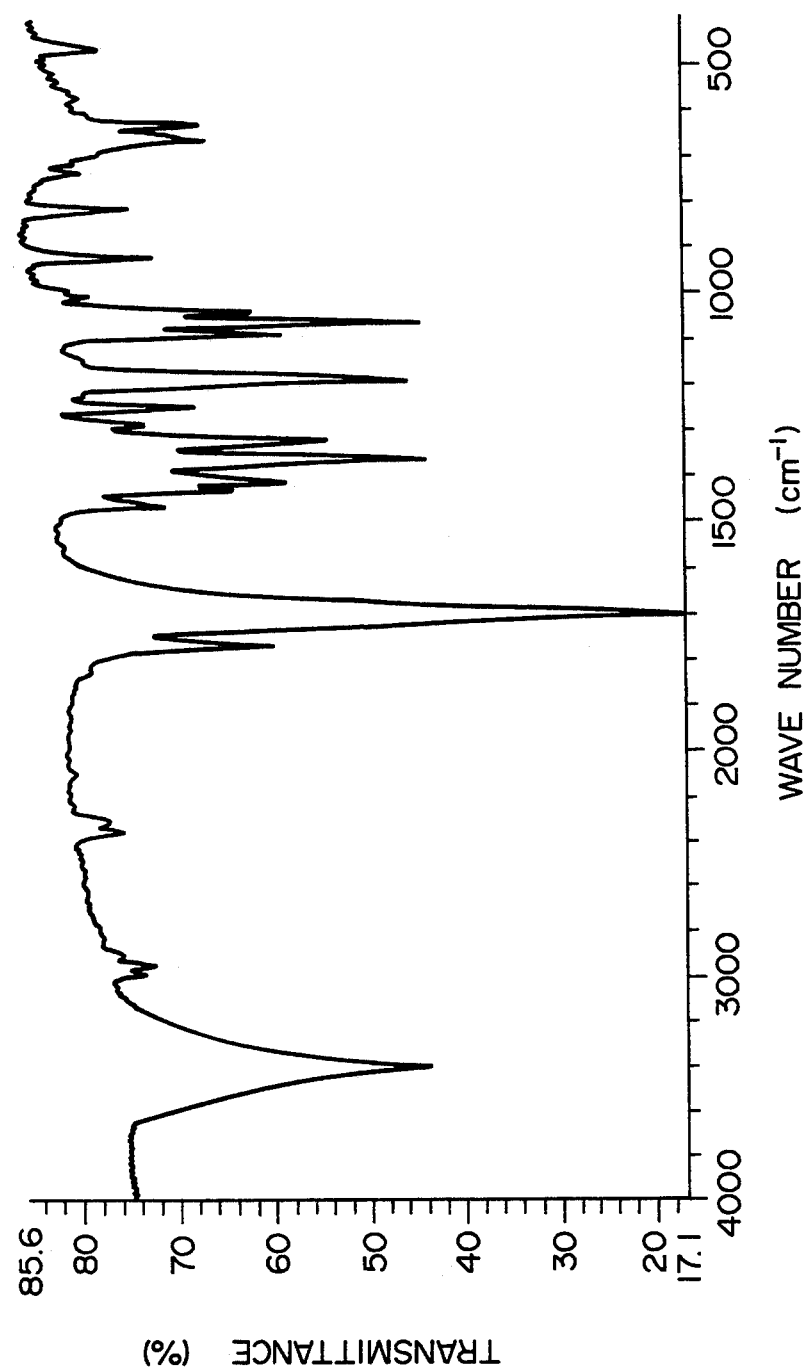
F I G. 13

COATING RESIN AND ANTIFOULING COATING COMPOSITION

BACKGROUND OF THE INVENTION

This invention relates to a coating resin and an antifouling coating composition to be used for preventing attachment of marine organisms to the underwater or submarine structures such as ships, fishing nets, drainage conduits, etc.

Numerous species of marine organisms, such as barnacle, ascidian, serpula, mussel, laver, etc., live in the sea water. When a structure such as a ship, fishing net, drainage pipe, etc., is set or placed in comission in or on the sea, the marine organisms cling to the structure and grow to give various kinds of damage to the structure. For instance, if the ship's bottom is incrusted with marine organisms, the frictional resistance of the sea water increases to cause a reduction of cruising performance of the ship, so that if it is tried to keep a constant cruising speed of the ship, its fuel consumption increases to pose a serious encomical problem. Also, if the marine organisms cling to the fishing nets used for ocean culture, the meshes of the nets would be clogged up, which could prove fatal to the cultured fishes and shellfishes.

Hitherto, in order to prevent attachment of the marine organisms to the underwater structures such as mentioned above, the antifouling paints using single polymers or copolymers of organotin-containing unsaturated monomers as resinous component (see Japanese Patent Application Kokoku (Post-Exam Publication) Nos. 40-21426, 44-9579, 46-13392, 49-20491, 51-11647, 51-12049, 52-48170, etc.) have been applied to said structures. These polymers have their organotin portion hydrolyzed with the sea water (pH: 8.0–8.3). As a result, not only the organotin serves as an antifouling agent, but also the polymer surface which has been made soluble in sea water is gradually corroded by the moving sea water to bare out the new coating surface, thus producing a long-lasting stabilized antifouling effect. However, the organotin released into the sea water from the paints is hard to decompose and may be taken in by and accumulated in the marine organisms and, through the food chain, it may get into the human system. This involves the possibility of causing serious physical trouble such as deformity. So, use of organotin in the antifouling paints has been banned.

Request is now voiced in the art for the development of a resin for antifouling paints which are capable of producing a long-lasting stabilized antifouling effect, in place of the organotin-based resins whose use has been banned. Ideally speaking, it is desirable that the resins used for antifouling paints are of a hydrolyzable type like the organotin-based resins, but proposals involving use of hydrophilic or water-repellent resins have also been made (Japanese Patent Application Kokai (Laid-Open) Nos. 62-290768, 62-13471, 58-180566, 57-67672, etc.). However, it is hardly possible to realize a long-lasting stabilized antifouling effect by use of a resin having the hydrophilic or water-repellent property alone.

In view of the above, various hydrolyzable resins having a specific carboxylic acid ester in the side chain have been proposed (WO 84/02915, Japanese Patent Appln. Kokai Nos. H2-69576, 63-215780, 62-57464, Japanese Patent Appln. Kokoku Nos. 55-39271, 61-3830, etc.), but their effect has not been well satisfactory.

It is essential that the resin used for said purpose is soluble in the aromatic solvents or the mixtures of aromatic solvents (main solvent) and other types of solvent such as alcohol type solvents, ketone type solvents, halogen type solvents, ether type solvents and ester type solvents so that the solvent used won't affect the undercoat when coating is performed.

SUMMARY OF THE INVENTION

The present invention provides an excellent coating resin and an antifouling coating composition containing said resin which has no poisonous action like the organotin copolymers, shows a hydrolytic property well comparing with said organotin copolymers, and is capable of forming a relatively long-lasting excellent antifouling coat. This coating resin is also soluble in aromatic solvents.

The present inventors have pursued strenuous studies for solving said prior art problems and developing an antifouling coating composition which performs excellently for preventing attachment of the marine organisms to the underwater structures such as mentioned above and has no problem in safety and sanitation, and have consequently accomplished the present invention.

The present invention provides a coating resin comprising a polymer obtained by polymerizing an unsaturated monomer represented by the following formula (I) alone or together with at least one other unsaturated monomer copolymerizable therewith:

$$CH_2=C(R)\text{-}(Ar)_k\text{-}(C(=O))_m\text{-}(CH_2)_n\text{-}C(=O)\text{-}O\text{-}X \quad (I)$$

wherein R is a hydrogen atom or a straight or branched alkyl group having 1–4 carbon atoms; Ar is a benzene ring or a naphthalene ring; k, m and n represent independently a number of 0 or 1; and X is a substituent selected from those represented by the following formulae:

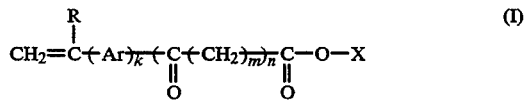

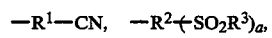

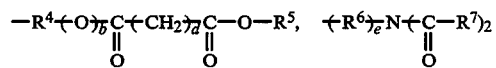

and 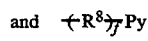

wherein $R^1$, $R^4$, $R^6$ and $R^8$ each represents a straight branched or alicyclic alkylene group having 1-6 carbon atoms; $R^2$ is a $C_{1-6}$ straight, branched or cyclic hydrocarbon group connecting O and $SO_2R^3$; a is an integer of 1 to 3 indicating the number of $SO_2R^3$ bonded to $R^2$; $R^3$ represents, independently when plural, a $C_{1-22}$ straight, branched or cyclic alkyl group, a $C_{6-10}$ aryl group or $C_{7-18}$ aralkyl group which may have a substituent; when a is 2 or 3, $R^3$'s may be the hydrocarbon groups forming a cyclic structure with each other; b, d, e and f represent independently a number of 0 or 1; $R^5$ is a $C_{1-4}$ straight or branched alkyl group; two $R^7$'s represent independently a $C_{1-22}$ straight, branched or alicyclic alkyl group, a $C_{6-10}$ aryl group or a $C_{7-10}$ aralkyl group, or two $R^7$'s represent the groups forming a cyclic structure; and Py stands for a substituted or unsubstituted 2-, 3- or 4-pyridyl group.

The present invention also provides a coating resin of the type recited, using as other copolymerizable unsaturated monomer a monomer represented by the formula:

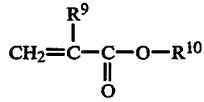
(II)

wherein $R^9$ is a hydrogen atom or $CH_3$; and $R^{10}$ is a branched or alicyclic alkyl, aryl or aralkyl group having 3 or more carbon atoms, or an organic substituent having a similar structure but containing other atoms than carbon.

The present invention also provides a coating resin of the type recited, using as other copolymerizable unsaturated monomer an unsaturated monomer having a hydrophilic functional group, said monomer being either an unsaturated acid anhydride or an unsaturated monomer represented by the formula:

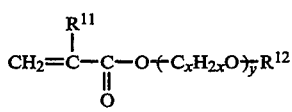
(III)

wherein $R^{11}$ is a hydrogen atom or a $CH_3$ group; x is an integer of 1 to 6; y is an integer of 1 to 10; and $R^{12}$ is a hydrogen atom or a straight, branched or cyclic alkyl, aryl or aralkyl group.

The present invention further provides an antifouling coating composition comprising said coating resin.

BRIEF DESCRIPTION OF THE DRAWINGS

FIG. 13 is an IR spectrum of N-hydroxymethylsuccinimide.

DESCRIPTION OF THE PREFERRED EMBODIMENTS

Figure 1:
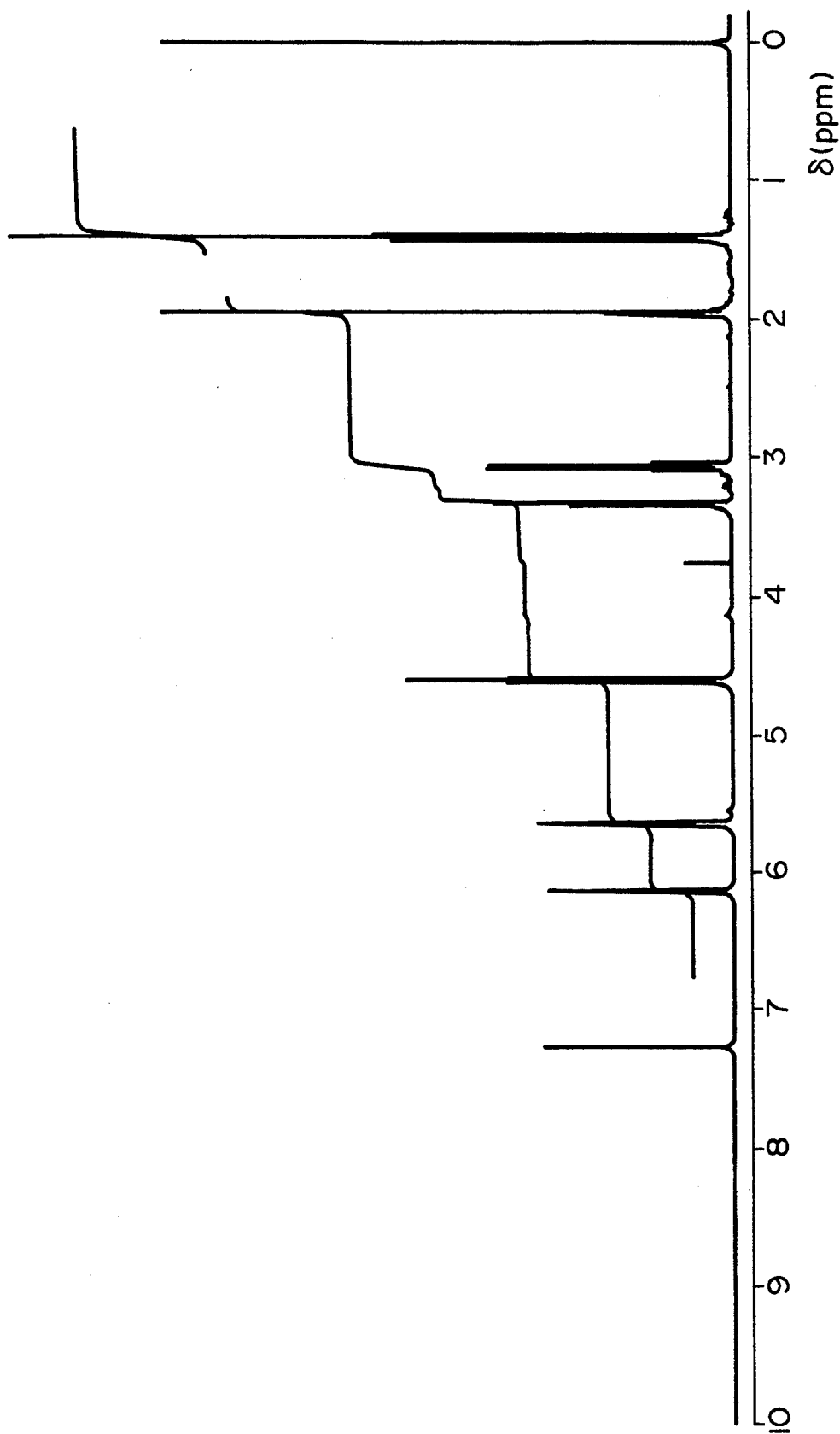
FIG. 1 is a $^1$H-NMR spectrum of Compound No. 10 (R=$CH_3$) in the list, given below, of the preferred examples of the unsaturated monomers represented by the formula (I).

The coating resins according to the present invention are preferably those specified below (1)–(9):

(1) A coating resin comprising a polymer obtained by polymerizing an unsaturated monomer represented by the following formula (I) alone or together with at least one other unsaturated monomer copolymerizable therewith:

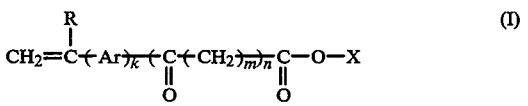
(I)

wherein R is a hydrogen atom or a straight or branched alkyl group having 1–4 carbon atoms; Ar is a benzene ring or a naphthalene ring; k, m and n represent independently a number of 0 or 1; and X is a substituent selected from those represented by the following formulae:

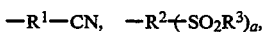

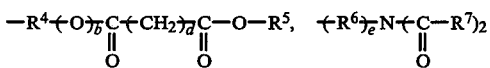

and 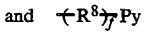

wherein $R^1$, $R^4$, $R^6$ and $R^8$ each represents a straight branched or alicyclic alkylene group having 1–6 carbon atoms; $R^2$ is a $C_{1-6}$ straight, branched or cyclic hydrocarbon group connecting 0 and $SO_2R^3$; a is an integer of 1 to 3 indicating the number of $SO_2R^3$ bonded to $R^2$; $R^3$ represents, independently when plural, a $C_{1-22}$ straight, branched or cyclic alkyl group, a $C_{6-10}$ alkyl group which may have a substituent or a $C_{7-18}$ aralkyl group which may have a substituent; when a is 2 or 3, $R^3$'s may be the hydrocarbon groups forming a cyclic structure with each other; b, d, e and f represent independently a number of 0 or 1; $R^5$ is a straight or branched alkyl group having 1–4 carbon atoms; two $R^7$'s represent independently a straight, branched or alicyclic alkyl group having 1–22 carbon atoms, an aryl group having 6–10 carbon atoms or an aralkyl group having 7–10 carbon atoms, or two $R^7$'s represent the groups forming a cyclic structure; and Py stands for a substituted or unsubstituted 2-, 3- or 4-pyridyl group.

(2) A coating resin specified in (1) above, using an unsaturated monomer of the formula (I) wherein k and n are both 0.

(3) A coating resin specified in (1) or (2) above, using an unsaturated monomer of the formula (I) wherein X is $-R^1-CH$.

(4) A coating resin specified in (1) or (2) above, using an unsaturated monomer of the formula (I) wherein X is $-R^2(SO_2R^3)_a$.

(5) A coating resin specified in (1), (2), (3) or (4) above, using an unsaturated monomer of the formula (I) wherein R is H or $CH_3$.

(6) A coating resin specified in (1), (2), (3), (4) or (5) above, wherein at least one other unsaturated monomer copolymerizable with the unsaturated monomer of the formula (I) is a monomer represented by the formula:

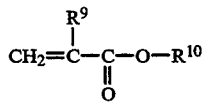

wherein $R^9$ is a hydrogen atom or $CH_3$; and $R^{10}$ is a branched or alicyclic alkyl, aryl or aralkyl group having 3 or more carbon atoms, or an organic substituent having a similar structure but containing other atoms than carbon.

(7) A coating resin specified in (1), (2), (3), (4), (5) or (6) above, wherein at least one other unsaturated monomer copolymerizable with the unsaturated monomer of the formula (I) is an unsaturated monomer having a hydrophilic functional group.

(8) A coating resin specified in (7) above, wherein the unsaturated monomer having a hydrophilic functional group is an unsaturated acid anhydride or an unsaturated monomer represented by the formula:

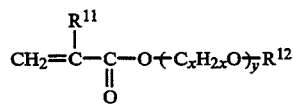

wherein $R^{11}$ is a hydrogen atom or a $CH_3$ group; x is an integer of 1 to 6; y is an integer of 1 to 10; and $R^{12}$ is a hydrogen atom or a straight, branched or cyclic alkyl, aryl or aralkyl group.

(9) A coating resin specified in any of (1) to (8) above, wherein the polymer is obtained by polymerizing a mixture of an unsaturated monomer represented by the formula (I), an unsaturated monomer represented by the formula (II) and one or more unsaturated monomers other than those having a hydrophilic functional group.

In the unsaturated monomers represented by the formula (I), the $C_{1-4}$ straight or branched alkyl groups represented by R include methyl, ethyl, propyl, isopropyl, butyl, isobutyl, sec-butyl, tert-butyl, etc. The $C_{1-6}$ straight, branched or alicyclic alkylene groups represented by $R^1$, $R^4$, $R^6$ and $R^8$ in X include methylene methine, ethylene, trimethylene, tetra-methylene, pentamethylene, neopentylene, hexamethylene, cyclopropylene, 1,2-cyclobutylene, 1,3-cyclobutylene, 1,2-cyclopentylene, 1,3-cyclopentylene, 1,2-cyclohexylene, 1,3-cyclohexylene, 1,4-cyclohexylene, etc. The $C_{1-22}$ straight, branched or cyclic alkyl groups represented by $R^3$ include methyl, ethyl, propyl, isopropyl, butyl, isobutyl, sec-butyl, tert-butyl, cyclopropyl, cyclobutyl, pentyl, sec-pentyl, tert-pentyl, neo-pentyl, cyclopentyl, hexyl, tert-hexyl, cyclohexyl, heptyl, tert-heptyl, octyl, tert-octyl, nonyl, tert-nonyl, decyl, tert-decyl, dodecyl, tert-dodecyl, tetradecyl, tert-tetradecyl, hexadecyl, tert-hexadecyl, octadecyl, tert-octadecyl, eicosyl, docodyl, etc. The $C_{6-10}$ aryl groups or $C_{7-18}$ aralkyl groups which may have a substituent include phenyl, tolyl, anisyl, cyanophenyl, nitrophenyl, sulfonylphenyl, acylphenyl, naphthyl, benzyl, phenethyl, benzhydryl, etc. As examples of the hydrocarbon groups forming a cyclic structure with each other, represented by $R^3$ or $R^3$'s (1–3), when n is 2, there can be mentioned ethylene, trimethylene, tetra-methylene, etc. The $C_{1-4}$ straight or branched alkyl groups represented by $R^5$ include methyl, ethyl, propyl, isopropyl, butyl, isobutyl, sec-butyl, tertbutyl, etc. The $C_{1-22}$ straight, branched or alicyclic alkyl groups represented by $R^7$ include methyl, ethyl, propyl, isopropyl, butyl, isobutyl, sec-butyl, tert-butyl, cyclopropyl, cyclobutyl, pentyl, sec-pentyl, tert-pentyl, neo-pentyl, cyclopentyl, hexyl, cyclohexyl, heptyl, octyl, nonyl, decyl, dodecyl, tetradecyl, hexadecyl, octadecyl, eicosyl, docosyl, etc. The $C_{6-10}$ aryl groups or $C_{7-10}$ aralkyl groups represented by $R^7$ include phenyl, tolyl, anisyl, cyanophenyl, nitrophenyl, naphthyl, benzyl, phenethyl, benzhydryl, etc. The groups forming a cyclic structure, represented by two $R^7$, include methylene, ethylene, trimethylene, o-phenylene, 1,2-naphthylene, 2,3-naphthylene, etc.

The unsaturated monomers represented by the formula (I) can be produced by various known processes of synthesis. It is possible to use the pertinent commercially available unsaturated monomers.

Listed below are the preferred examples of the unsaturated monomers represented by the formula (I) (R in the following formulae is hydrogen atom or methyl group):

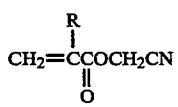

(1)

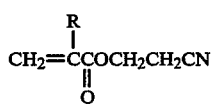

(2)

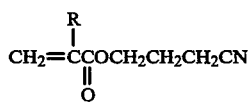

(3)

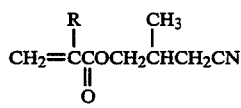

(4)

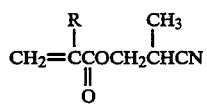

(5)

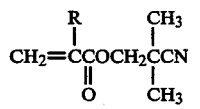

(6)

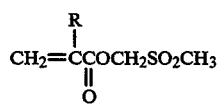

(7)

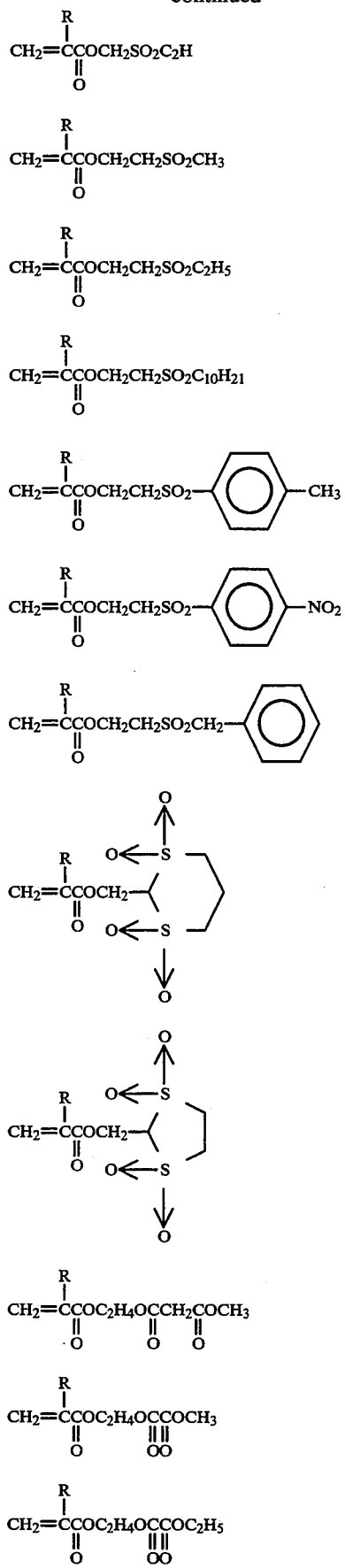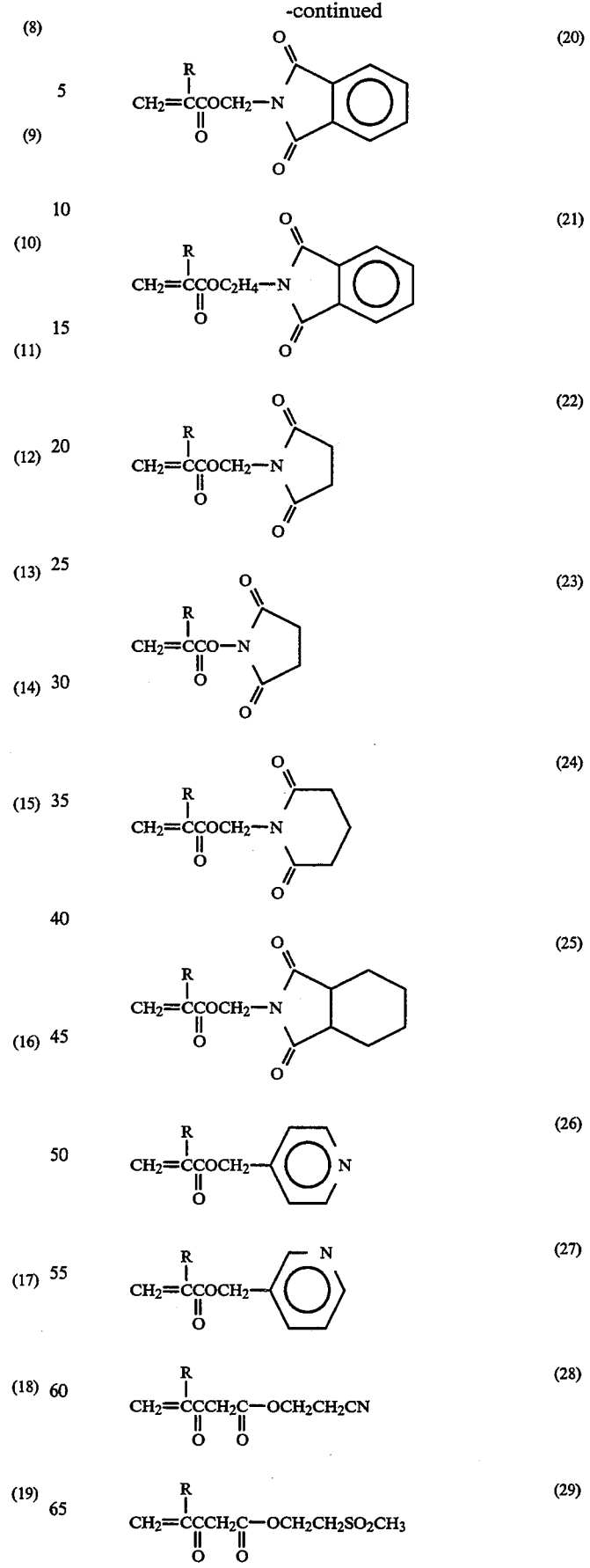

-continued

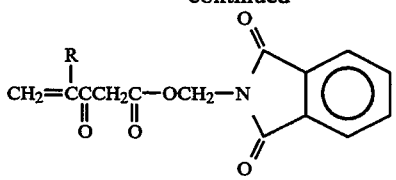 (30)

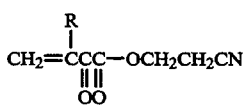 (31)

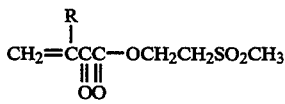 (32)

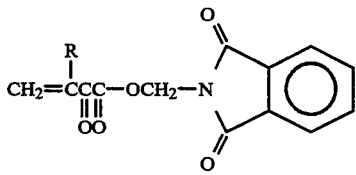 (33)

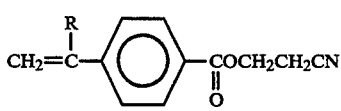 (34)

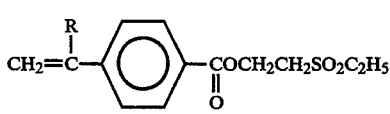 (35)

The compounds of the formula (I) wherein $R^3$'s represent the hydrocarbon groups forming a cyclic structure with each other are, for example, Compound No. 15 and Compound No. 16 shown in the above list.

The compounds of the formula (I) wherein two $R^7$'s represent the groups forming a cyclic structure are, for example, Compound Nos. 20, 21, 22, 23, 24, 25, 30 and 33 in the above list.

These compounds are easily hydrolyzed in a weakly alkaline atmosphere such as sea water. Therefore, the resin obtained by polymerizing or copolymerizing these unsaturated monomers undergoes hydrolysis in the sea water and is gradually changed into a water-soluble type from its surface, and as this portion is corroded by the moving sea water, the surface of a new coat is bared out successively, thus producing a lasting antifouling effect.

The ratio of the unsaturated monomer of the formula (I) in the resin may be optionally selected provided that it is not less than 0.1 mol% based on the whole amount of the monomers. Such unsaturated monomer may be used alone to form a homopolymer. But if its ratio is small, the proportion of the soluble portion in the resin created by the hydrolysis may prove too low to produce a satisfactory antifouling performance. On the other hand, if its ratio is too high, the eluting rate tends to be increased, resulting in a poor long-time antifouling performance. Thus, the preferred ratio of said unsaturated monomer is 1 to 95 mol%, more preferably 5 to 70 mol%.

As the other unsaturated monomer copolymerizable with the unsaturated monomer of the formula (I), the unsaturated monomers represented by the formula (II) and the unsaturated monomers having a hydrophilic functional group are preferably used.

In the unsaturated monomers represented by the formula (II), the branched or alicyclic alkyl, aryl or aralkyl groups having 3 or more carbon atoms, represented by $R^{10}$, include isopropyl isobutyl sec-butyl tert-butyl, sec-pentyl, tert-pentyl, neopentyl, 2-ethylhexyl, cyclopropyl, cyclobutyl, cyclopentyl, cyclohexyl, phenyl, o-tolyl, m-tolyl, p-tolyl, 2,3-xylyl, 2,4-xylyl, o-cumenyl, m-cumenyl, p-cumenyl, mesityl, benzyl, phenethyl, trityl, naphthyl, norbornyl, adamantyl, etc. The organic substituents having a similar structure but containing other atoms than carbon include the compounds having silicon instead of carbon, such as trimethylsilyl, triethylsilyl, tripropylsilyl, tributylsilyl, triphenylsilyl, trimethoxysilyl, triethoxysilyl, tripropoxysilyl, tributoxysilyl, triphenoxysilyl, etc.

The unsaturated monomers represented by the formula (II) can be produced by various known synthetic methods. The pertinent commercially available unsaturated monomers are also usable.

Listed below are the preferred examples of the unsaturated monomers represented by the formula (II) (R in the following formulae is hydrogen atom or methyl group):

 (36)

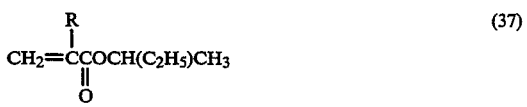 (37)

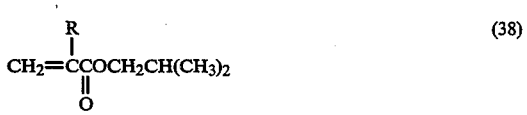 (38)

 (39)

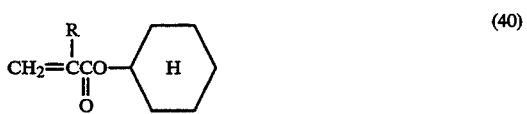 (40)

 (41)

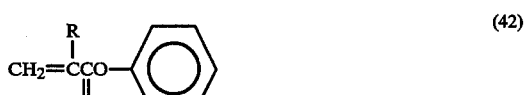 (42)

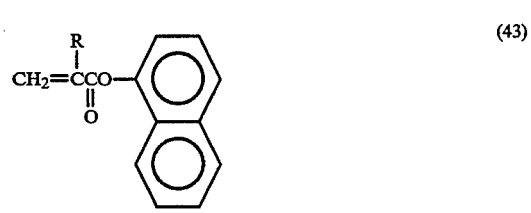 (43)

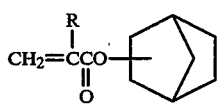
(44)

An unsaturated monomer of the formula (II) can be blended for the purpose of increasing solubility in the solvents, especially aromatic solvents. The blending ratio of this unsaturated monomer is preferably from 5 to 95 mol%. A too low blending ratio results in a poor solubility in the aromatic solvents, while a too high ratio leads to strengthened hydrophobic nature of the resin, which impairs the hydrolytic characteristics of the resin, resulting in poor antifouling performance of the produced paint. Thus, the especially preferred range of blending ratio of said unsaturated monomer is from 5 to 50 mol%.

Examples of the unsaturated monomers having a hydrophilic functional group, which are usable in this invention, include unsaturated acid anhydrides or the unsaturated monomers represented by the formula:

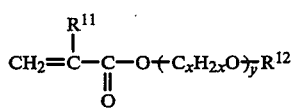
(III)

wherein $R^{11}$ is hydrogen atom or $CH_3$ group; x is an integer of 1 to 6; y is an integer of 1 to 100; and $R^{12}$ is hydrogen atom or straight, branched or cyclic alkyl, aryl or aralkyl group. Use of these monomers can further enhance the hydrolytic nature provided by the unsaturated monomer of the formula (I).

In the unsaturated monomers represented by the formula (III), the straight, branched or cyclic alkyl, aryl or aralkyl groups represented by $R^{12}$ include methyl, ethyl, propyl, isopropyl, butyl, isobutyl, sec-butyl, tert-butyl, pentyl, sec-pentyl, tert-pentyl, neopentyl, 2-ethylhexyl, cyclopropyl, cyclobutyl, cyclopentyl, cyclohexyl, phenyl, o-tolyl, m-tolyl, p-tolyl, 2,3-xylyl, 2,4-xylyl, o-cumenyl, m-cumenyl, p-cumenyl, mesityl, benzyl, phenetyl, trityl, naphthyl, norbonyl, etc.

The unsaturated monomers of the formula (III) can be produced by various known synthetic methods. The commercially available unsaturated monomers are also usable.

The following are the preferred examples of the compounds represented by the formula (III) (R in the following formulae is hydrogen atom or methyl group):

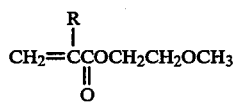
(45)

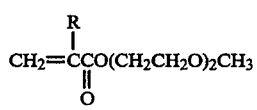
(46)

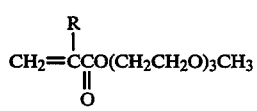
(47)

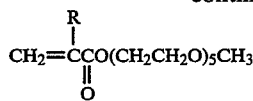
(48)

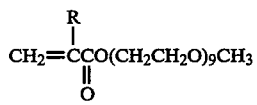
(49)

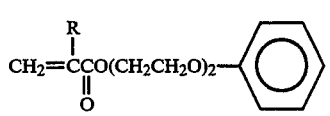
(50)

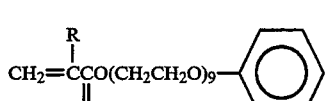
(51)

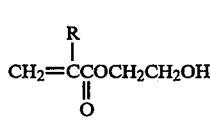
(52)

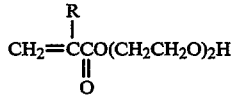
(53)

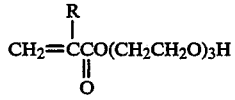
(54)

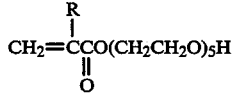
(55)

Examples of the unsaturated acid anhydrides usable as an unsaturated monomer having a hydrophilic functional group include maleic anhydride, methylmaleic anhydride, dimethylmaleic anhydride, ethylmaleic anhydride, phenylmaleic anhydride, chloromaleic anhydride, itaconic anhydride, 1-methylitaconic anhydride, 1,2-dimethylitaconic anhydride, 1-phenyl itaconic anhydride, 1-chloroitaconic anhydride, endomethylenetetrahydrophthalic anhydride, chlorendic anhydride, tetrahydrophthalic anhydride, etc.

The blending ratio of the unsaturated monomer having a hydrophilic functional group is preferably from 1 to 70 mol%, more preferably from 5 to 50 mol%. When the blending ratio is less than 1 mol%, the effect of addition of this unsaturated monomer is almost nil. On the other hand, when the blending ratio exceeds 70 mol%, there not only tend to arise the adverse effects such as reduction of coating hardness, but there also takes place elution by the action derived from the hydrophilic nature alone, making it impossible to obtain the desired coating film properties to be provided by a good resin for antifouling paints.

These unsaturated monomers having a hydrophilic functional group may be used either singly or in combination.

As examples of the unsaturated monomers other than those of the formulae (I) and (II) and those having a hydrophilic functional group, there can be cited acrylic or methacrylic ester monomers such as acrylic or methacrylic methyl ester, ethyl ester, n-propyl ester, n-butyl ester, etc., styrene monomers such as styrene, α-methylstyrene, p-t-butylstyrene, etc., polyolefin monomers such as butadiene, isoprene, chloroprene, etc., vinyl monomers such as vinyl chloride, vinyl acetate, etc., acrylonitrile, methacrylonitrile, and the like. These monomers may be used either singly or as a mixture of two or more of them.

The unsaturated monomers other than those of the formulae (I) and (II) and those having a hydrophilic functional group are used for the purpose of adjusting hardness of the coating film, glass transition temperature (Tg) of the resin, pigment dispersibility of the paint, rate of hydrolysis and elution by the sea water, etc. The blending ratio of this monomer is selected within the range of 1 to 95 mol%, preferably 10 to 90 mol%.

In order to afford additional qualities such as reactivity to the polymer, a monomer such as acrylic acid, methacrylic acid, glycidyl acrylate, glycidyl methacrylate, N-vinylpyrrolidone or a derivative thereof may be copolymerized depending on purposes.

Said unsaturated monomers may be used either singly or in combination.

Preparation of the polymer or copolymer (hereinafter simply refer to as "polymer") can be accomplished by treating said substances according to a per se known method, for example, by carrying out a reaction of said unsaturated monomers (mixture) in an appropriate solvent in the presence of a radical polymerization catalyst at a temperature of about 0° to 180° C., preferably about 40° to 170° C., for a period of about one to 20 hours, preferably about 4 to 10 hours.

As for the organic solvent used for the polymerization, any type of organic solvent can be used as far as it is capable of dissolving the produced polymer so that no gelation will occur in the course of polymerization reaction. Examples of such organic solvents include the alcohol type solvents such as ethanol, propanol, butanol, isobutanol and benzyl alcohol; ether type solvents such as methyl Cellosolve, ethyl Cellosolve, ethylene glycol dimethyl ether, ethylene glycol monoacetate and 1,4-dioxane; aromatic hydrocarbon type solvents such as toluene and xylene; ester type solvents such as ethyl acetate and butyl acetate; ketone type solvents such as cyclohexanone and methyl isobutyl ketone; and halogen type solvents such as carbon tetrachloride and trichloroethane. However, when the product is intended to be used as an antifouling paint, it is preferable to use an aromatic solvent or a mixture of an aromatic solvent with other type(s) of solvent (in a smaller amount) so that the solvent won't act on the undercoat in the coating operation.

As regards the radical polymerization catalyst used in the preparation of said polymer, it is possible to employ the radical polymerization initiators used for ordinary radical polymerization, such as azo-compounds, peroxide compounds and the like. The number-average molecular weight of the obtained polymer is not critical in this invention, but in view of the properties of coating resin, said number-average molecular weight is preferably in the range from 3,000 to 200,000, more preferably from 5,000 to 50,000. The number-average molecular weight shown herein is the value determined by measuring the molecular weight according to gel permeation chromatography and reducing it according to a standard polystyrene calibration curve.

An appropriate chain transfer agent may be blended at the time of polymerization for the purpose of adjusting the molecular weight. Examples of the chain transfer agents usable for said purpose include methanethiol, ethanethiol, n-propanethiol, isopropanethiol, n-butanethiol, 2-methylpropanethiol, 3-methylpropanethiol, 1,1-dimethylethanethiol, 1-hexanethiol, 1-octanethiol, 1-decanethiol, benzenethiol, 2-methylbenzenethiol, 3-methylbenzenethiol, 4-methylbenzenethiol, 2-ethylbenzenethiol, 3-ethylbenzenethiol, 4-ethylbenzenethiol, bis(4-hydroxydimethylphenyl)disulfide, bis(2-chloromethylphenyl) disulfide, bis(2-bromophenyl) disulfide, dinaphthyl disulfide, di-2-benzothia disulfide, α-methylstyrene dimer, carbon tetrachloride, carbon tetrabromide and chloroform. The amount of the chain transfer agent to be blended may be properly selected according to the molecular weight of the polymer to be produced.

The thus obtained polymer shows an appropriate hydrolysis-elution property and can be applied as a coating resin suited for antifouling coating compositions. The coating resin according to the present invention may further comprises other polymer(s) within limits not prejudiciary to the effect of the present invention. Such polymers include, for example, vinyl copolymers such as acrylic copolymers, styrene-acrylic copolymers, polyvinyl chloride, etc.; polyesters; polysiloxanes; etc.

The coating resin of this invention, if necessary, may be blended with a known coloring matter, a known antifouling agent and various other additives in the course of preparation of an antifouling coating composition.

Typical examples of the antifouling agents usable in this invention are zinc suboxide, zinc chromate, strontium chromate, cupric chromate, cupric ferrocyanate, cupric quinone, cupric 6-hydroquinone, cupric oleate, cupric nitrate, cupric phosphate, cupric tartrate, cuprous oxide, cuprous iodide and cuprous sulfite.

Typical examples of the pigments usable in this invention include inorganic pigments such as titanium oxide (titanium white), iron oxide and carbon black, and organic pigments such as azo type, cyanine type and quinacridone type. Usually, however, an inorganic pigment is used.

Joint use of an organotin compound, triazine compound, organosulfur compound or the like with the above-mentioned compounds as antifouling agent is embraced within the concept of this invention.

It is also possible to use rosin, gum rosin, wood rosin, tall oil rosin or the like as elution assistant.

The antifouling coating composition of this invention obtained in the manner described above is useful as bottom paint, paint for fishing nets, etc.

The present invention is further described below with reference to the Examples of the invention, which Examples however do not limit the present invention in any way.

Synthesis Example 1

Synthesis of 2-ethylsulfonylethyl methacrylate (Compound No. 10, R=CH$_3$)

A mixture of 315 g (3.15 mol) of methyl methacrylate, 145 g (1.05 mol) of 2-ethylsulfonylethanol, 8.7 g (30.6 mmol) of titanium tetraisopropoxide and 0.16 g of hydroquinone was reacted at 100° C. for 4.5 hours under air-bubbling with removal of methanol produced. After cooling, 11 ml of water was added to the reaction mixture and the resulting mixture was stirred well. After removal of the aqueous phase, 200 ml of water was added to the organic layer and the resulting mixture was extracted with chloroform. The chloroform solution was dried over anhydrous sodium sulfate and then chloroform and excess methyl methacrylate were distilled off under reduced pressure to obtain 164 g of a colorless transparent oily substance in a yield of 75%. From its physical properties shown below, this oily substance was confirmed to be 2-ethylsulfonylethyl methacryalte (Compound No. 10, R=CH$_3$).

(1) $^1$NMR spectral data ($^1$NMR spectrum as shown in FIG. 1):

δ(solvent: CDC$_3$) unit: ppm, in all Examples)
6.14 (1H, t-like m), 5.65 (1H, quintet-like m),
4.60 (2H, t, J=5.80 Hz), 3.34 (2H, t, J=5.8 Hz),
3.07 (2H, q, J=7.60 Hz), 1.96 (3H, t-like m),
1.42 (3H, t, J=7.60 Hz).

Figure 2:
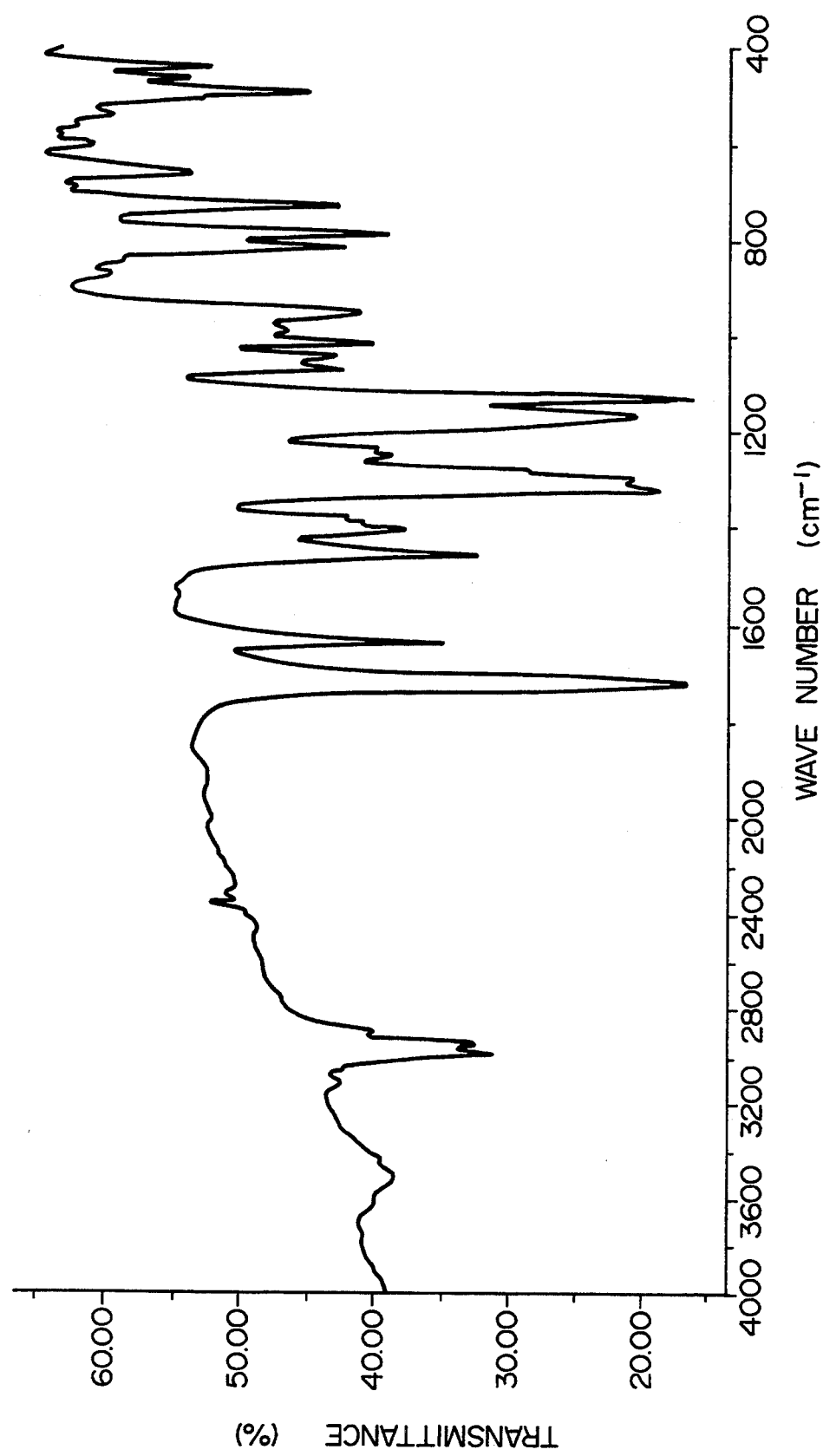
FIG. 2 is an IR spectrum of Compound No. 10 (R=$CH_3$).

(2) IR spectral (neat) values (IR spectrum as shown in FIG. 2):

1721 cm$^{-1}$ (C=O), 1321, 1126 cm$^{-1}$ (SO$_2$).

Synthesis Example 2

Synthesis of 2-(p-toluenesulfonyl)ethyl methacrylate (Compound No. 12, R=CH$_3$)

To a 15 ml acetone solution of 4.8 g (24 mmol) of 2-(p-toluenesulfonyl)ethanol and 2.4 g (24 mmol) of triethylamine, 0.5 mg of hydroquinone was added, followed by dropwise addition of 2.5 g (24 mmol) of methacryloyl chloride while maintaining the mixture temperature below 10° C. by cooling with an ice bath. After the dropwise addition was completed, the mixture was stirred for 30 minutes while maintaining the mixture temperature at 0° C. and then further stirred for additional 30 minutes at room temperature. The white precipitate of triethylammonium chloride was filtered off and the filtrate was poured into ice water. The precipitated colorless solid was filtered, dried and recrystallized from hexane to give 4.3 g of colorless crystals (yield: 68%). From the analytical results shown below, the obtained crystals were confirmed to be those of 2-(p-toluenesulfonyl)ethyl methacrylate (Compound No. 12, R=CH$_3$).

(1) Melting point: 72° C.

Figure 3:
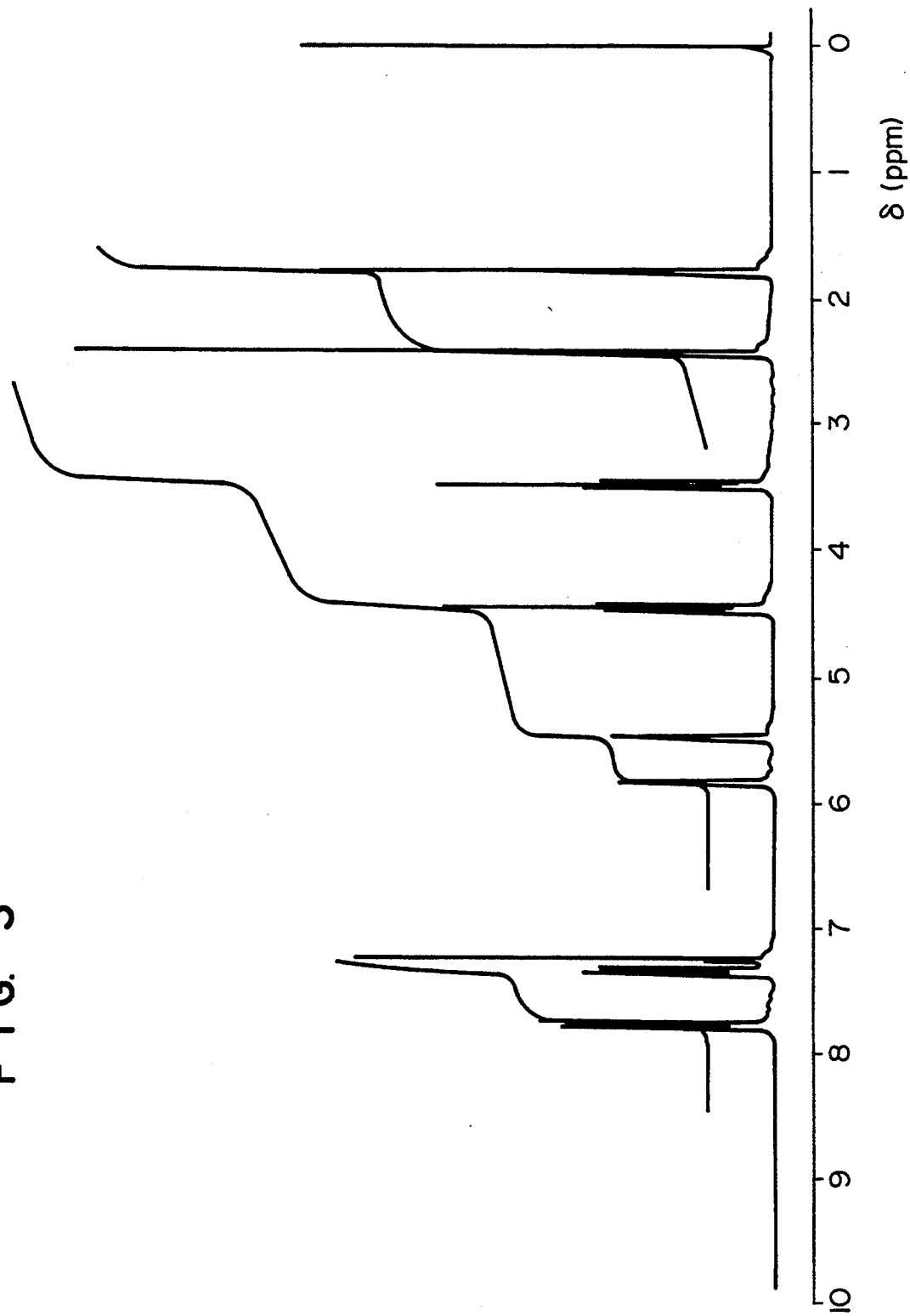
FIG. 3 is a $^1$H-NMR spectrum of Compound No. 12 (R=$CH_3$).

(2) $^1$NMR spectral values ($^1$NMR spectrum as shown in FIG. 3):

δ(CDCl$_3$): 7.80 (2H, d, J=8.09 Hz), 7.36 (2H, d, J=8.09 Hz), 5.84 (1H, t-like m), 5.49 (1H, quintet-like m), 4.47 (2H, t, J=6.11 Hz),
3.49 (2H, t, J=6.11 Hz), 2.44 (3H, s), 1.80 (3H, t-like m).

Figure 4:
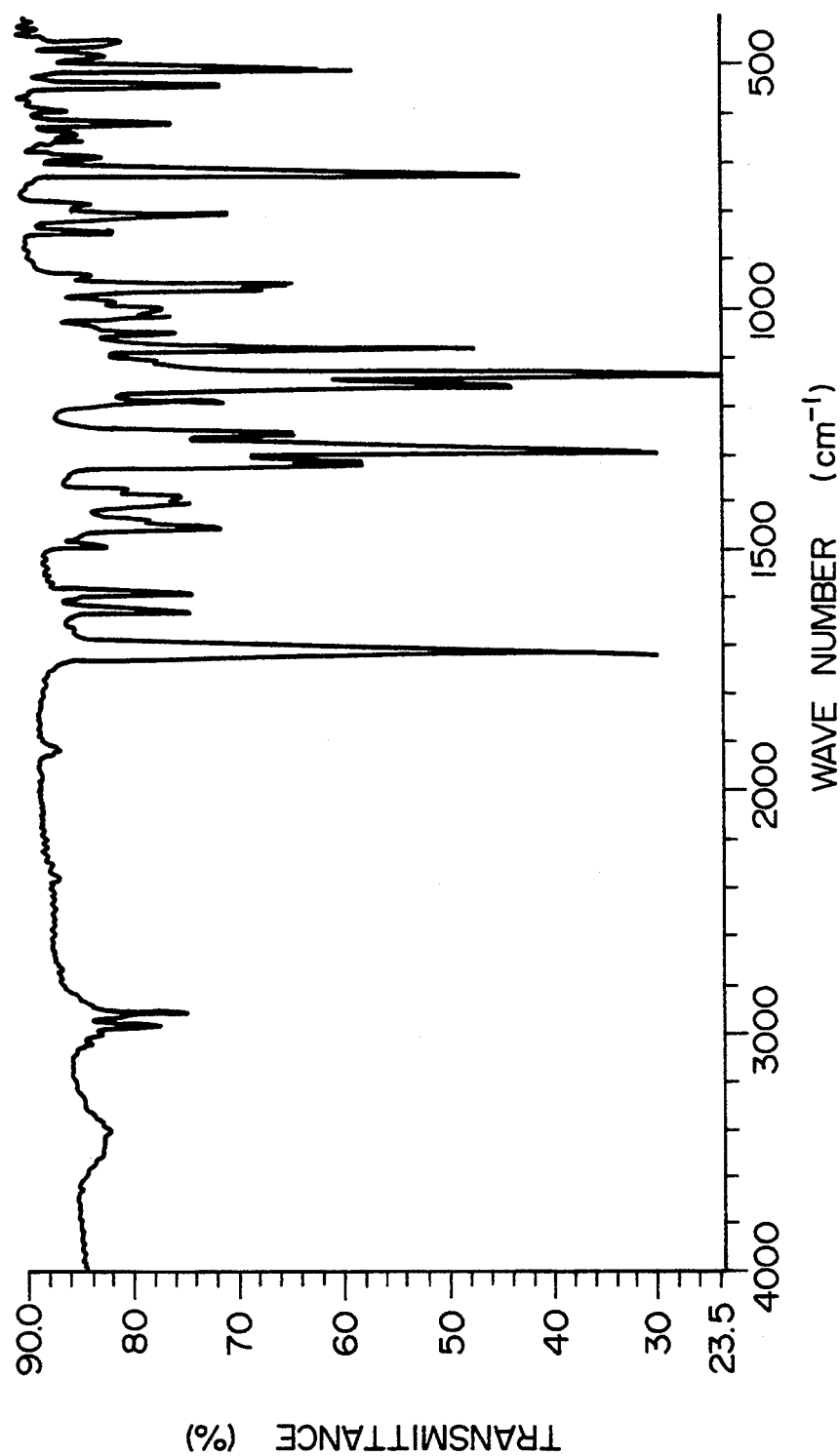
FIG. 4 is an IR spectrum of Compound No. 12 (R=$CH_3$).

(3) IR spectral values (KBr method) (IR spectrum as shown in FIG. 4):

1705 cm$^{-1}$ (C=0), 1300, 1140 cm$^{-1}$ (SO$_2$).

Synthesis Example 3

Synthesis of 2-cyanoethyl methacryalte (Compound No. 2, R=CH$_3$)

A mixture of 120 g (1.20 mol) of methyl methacrylate, 28.4 g (0.4 mol) of 2-cyanoethanol, 1.46 g (5.14 mmol) of titanium tetraisopropoxide and 42 mg of hydroquinonemonomethyl ether was treated as in Synthesis Example 1, and the resulting oily substance was distilled under reduced pressure to obtain 21 g of a colorless liquid having a boiling point of 70° C./0.5 mmHg (yield: 75%). From its physical properties shown below, this liquid was confirmed to be 2-cyanoethyl methacrylate (Compound No. 2, R=CH$_3$).

Figure 5:
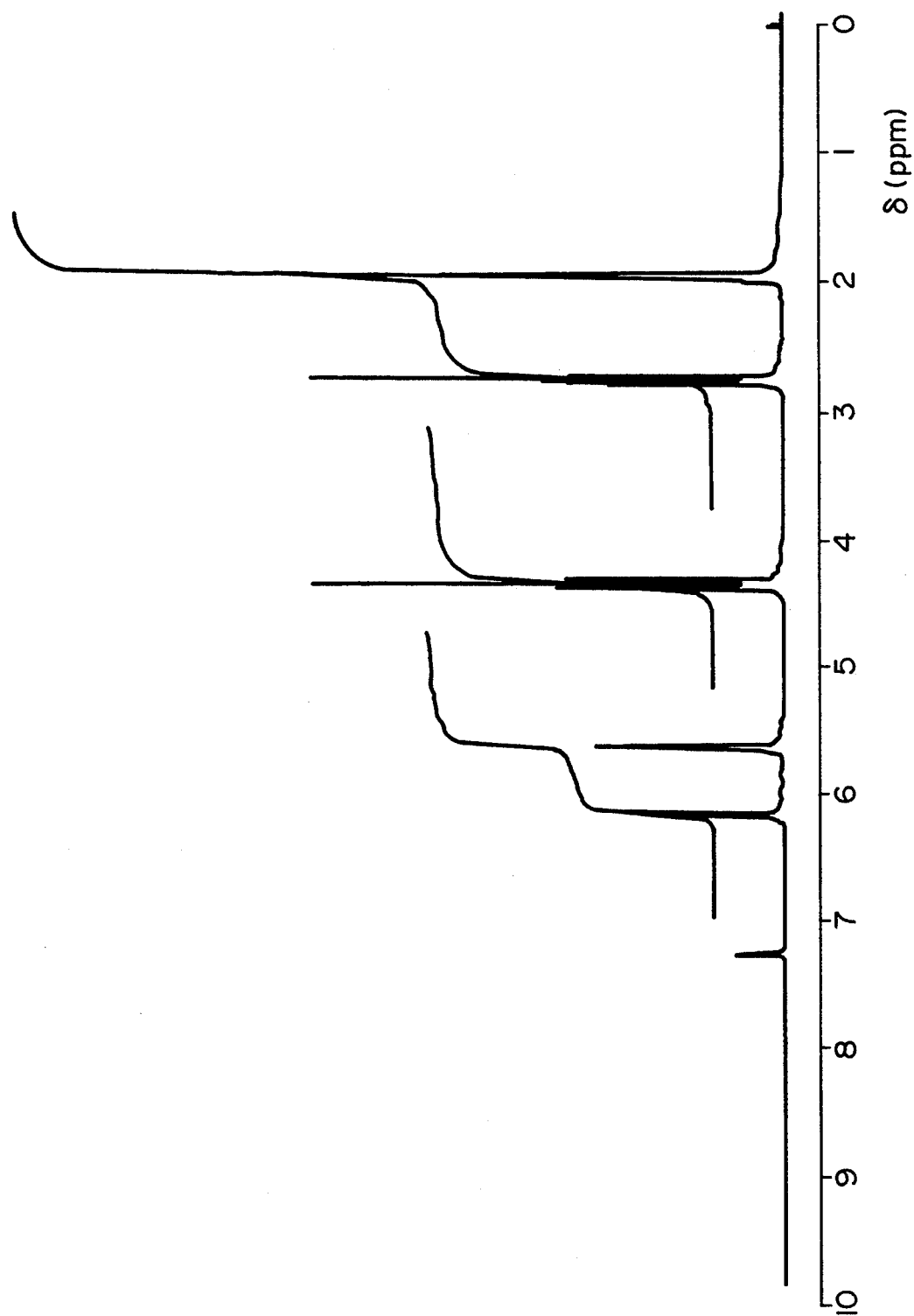
FIG. 5 is a $^1$H-NMR spectrum of Compound No. 2 (R=$CH_3$).

(1) $^1$NMR spectral data ($^1$NMR spectrum as shown in FIG. 5):

δ(CDCl$_3$): 6.19 (1H, t-like m), 5.66 (1H, quintet-like m), 4.36 (2H, t, J=6.41 Hz), 2.76 (2H, t, J=6.4 Hz), 1.97 (3H, t-like m).

Figure 6:
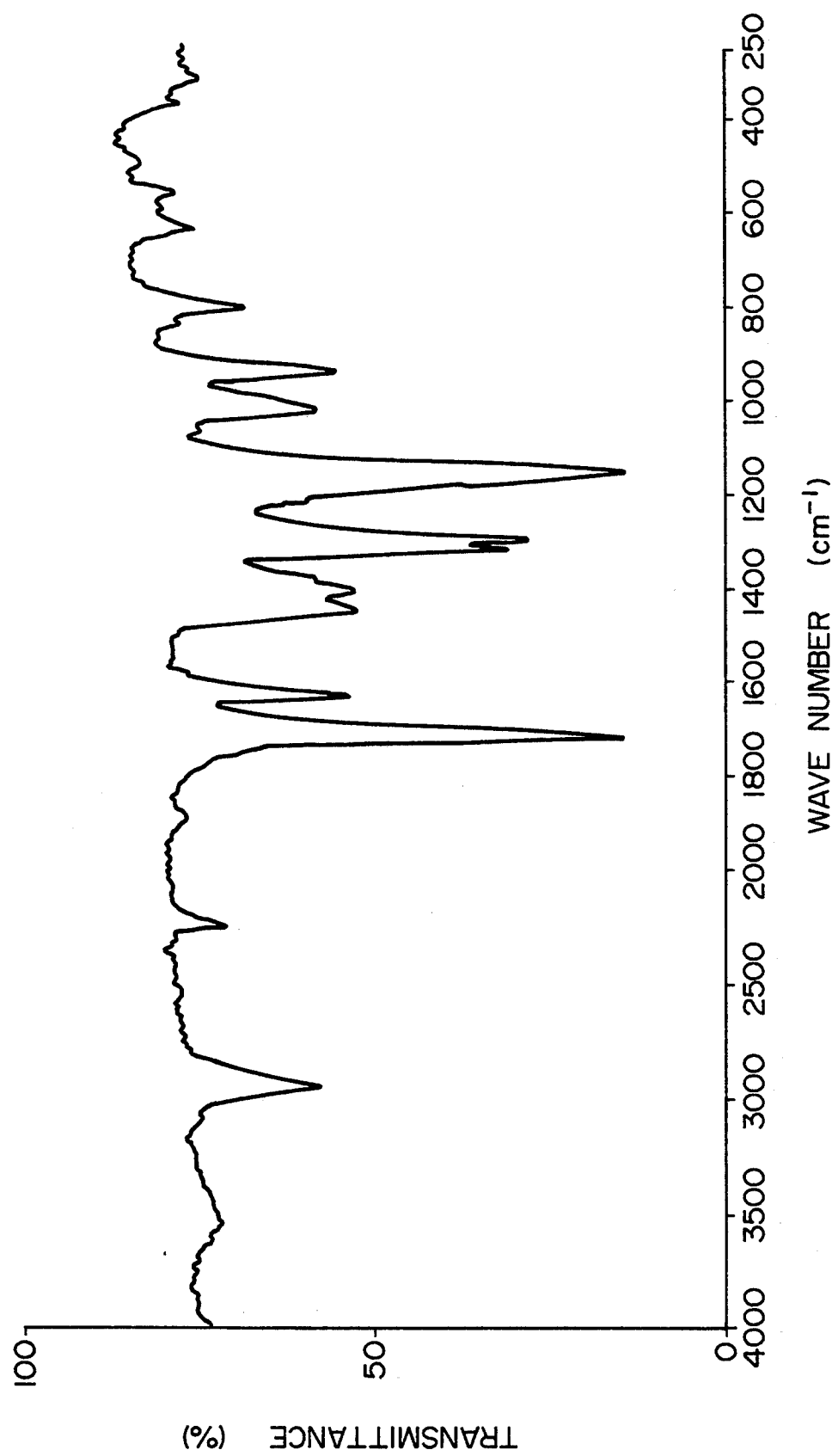
FIG. 6 is an IR spectrum of Compound No. 2 (R=$CH_3$).

(2) IR spectral (neat) data (IR spectrum as shown in FIG. 6):

2250 cm$^{-1}$ (C N), 1721 (C=O).

Synthesis Example 4

Synthesis of 2-methoxalyloxyethyl methacrylate (Compound No. 18, R=CH$_3$)

A mixture of 45.4 g (384 mmol) of dimethyl oxalate, 10 g (77 mmol) of 2-hydroxyethyl methacrylate, 0.2 g (0.7 mmol) of titanium tetraisopropoxide and 5 mg of hydroquinone was reacted at 100° C. for 6 hours under air-bubbling with removal of methanol produced. Excess dimethyl oxalate was removed by sublimation. The resulting material containing the white precipitate was filtered to remove the white precipitate, and the mother liquor was purified by silica gel column chromatography (eluent: hexane/ethyl acetate =8/2) to obtain 10.7 g of a colorless liquid (yield: 64%). From its analytical results shown below, this liquid was confirmed to be 2-methoxalyloxyethyl methacrylate (Compound No. 18, R=CH$_3$).

Figure 7:
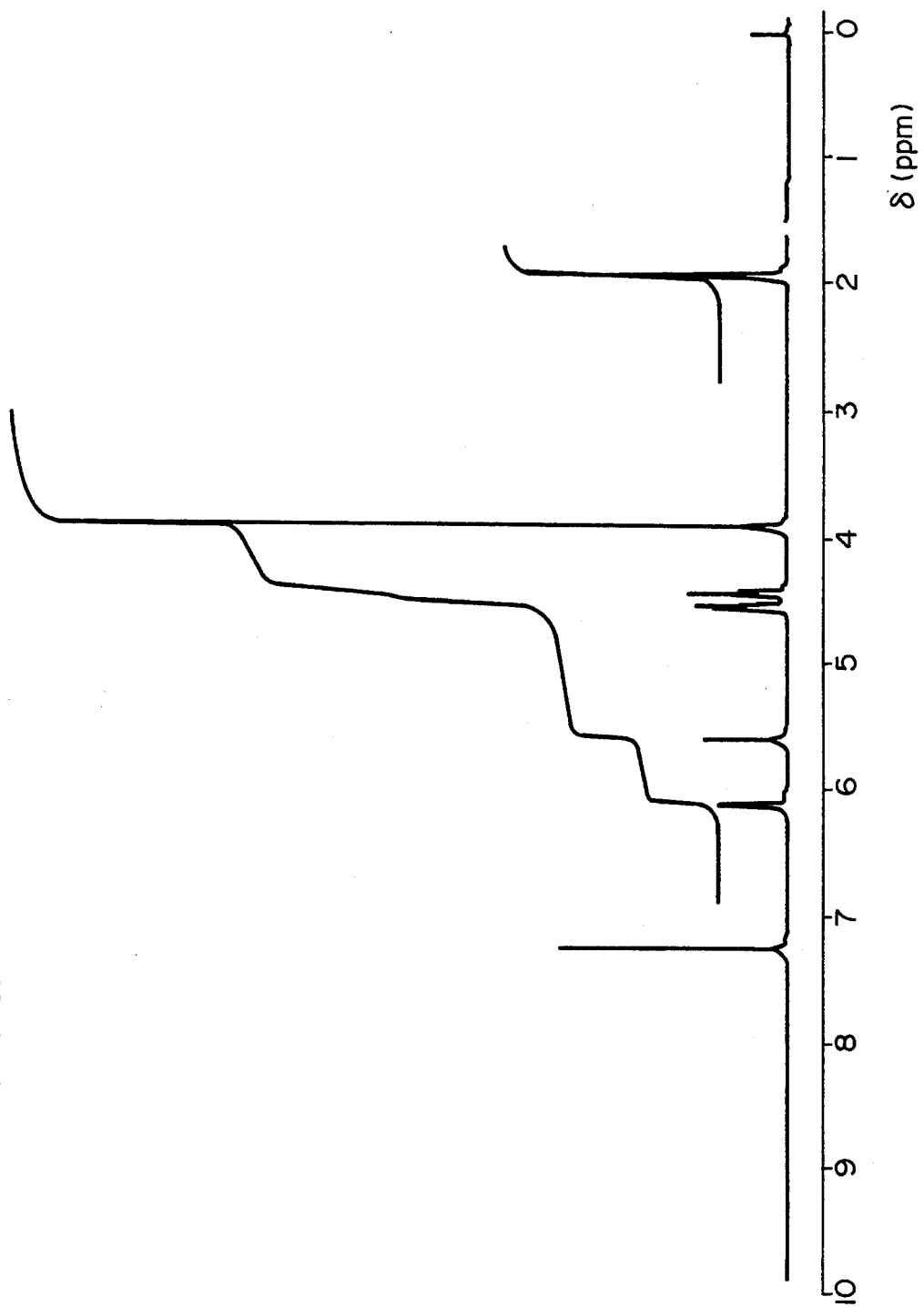
FIG. 7 is a $^1$H-NMR spectrum of Compound No. 18 (R=$CH_3$).

(1) $^1$NMR spectral data ($^1$NMR spectrum as shown in FIG. 7):

δ(CDCl$_3$): 6.14 (1H, t-like m), 5.61 (1H, quintet-like m), 4.56 (2H, m), 4.44 (2H, m), 3.92 (3H, s), 1.95 (3H, t-like m).

Figure 8:
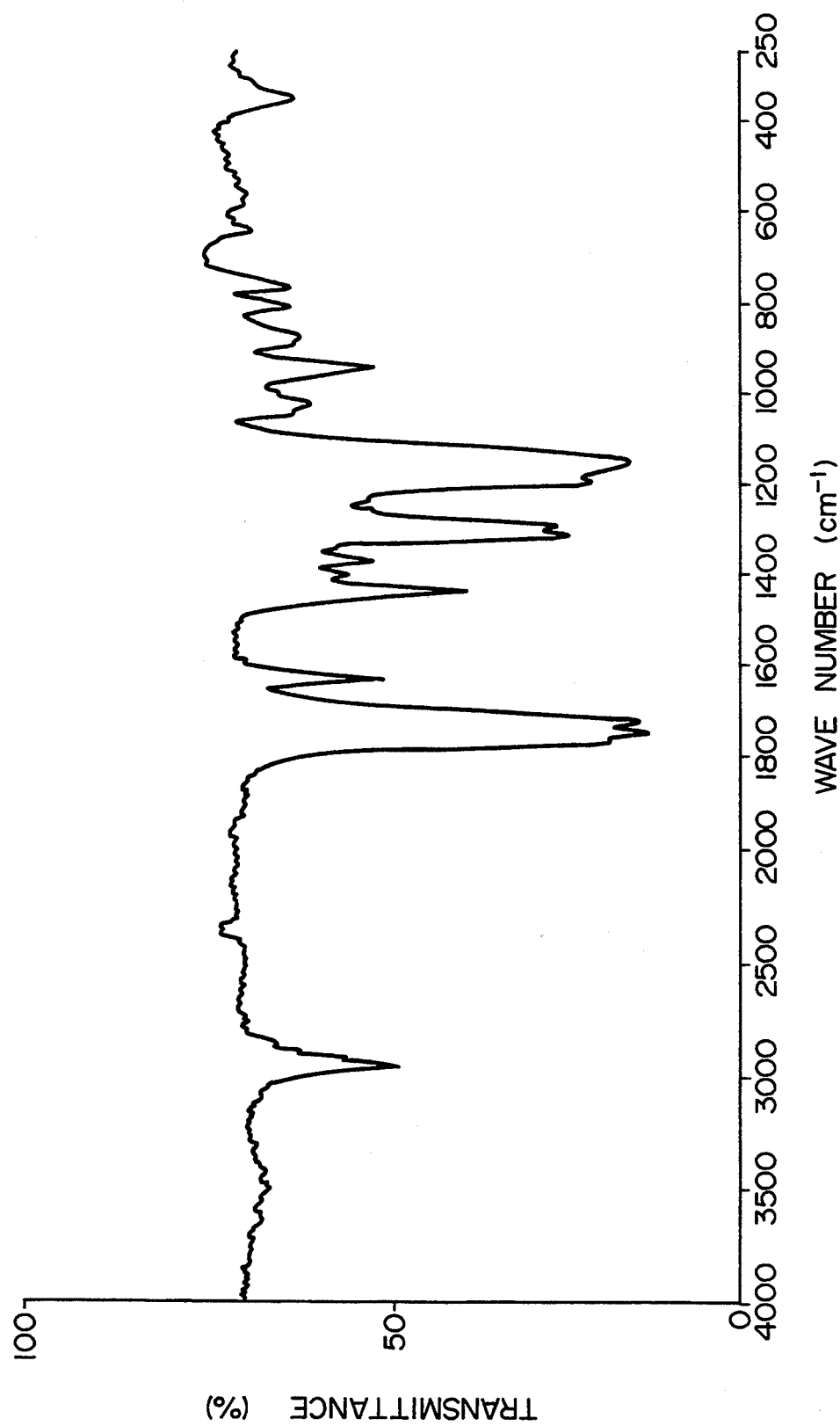
FIG. 8 is an IR spectrum of Compound No. 18 (R=$CH_3$).

(2) IR spectral (neat) data (IR spectrum as shown in FIG. 8):

1750, 1725 cm$^{-1}$ (C=O).

Synthesis Example 5

Synthesis of 2-ethoxalyloxyethyl methacrylate (Compound No. 19, R=CH$_3$)

A 20 ml acetone solution of 4.8 g (36.6 mmol) of 2-hydroxyethyl methacrylate, 3.7 g (36.6 mmol) of triethylamine and 1 mg of hydroquinone was cooled to 0° C. Then 5 g (36.6 mmol) of ethyl chloroglyoxalate was added dropwise to the solution with stirring while maintaining the mixture temperature substantially at 0° C. After the dropwise addition was completed, the reaction mixture was stirred at 0° C. for 30 minutes and then further stirred at room temperature for additional minutes. The produced white precipitate was filtered off and the filtrate was concentrated to obtain an oily substance. This oily substance was purified by silica gel column chromatography (eluent: hexane/ethyl acetate =8/2) to obtain 5.9 g of a colorless liquid (yield: From its analytical results shown below, this liquid was confirmed to be 2-ethoxalyloxyethyl methacrylate (Compound No. 19, R=CH$_3$).

Figure 9:
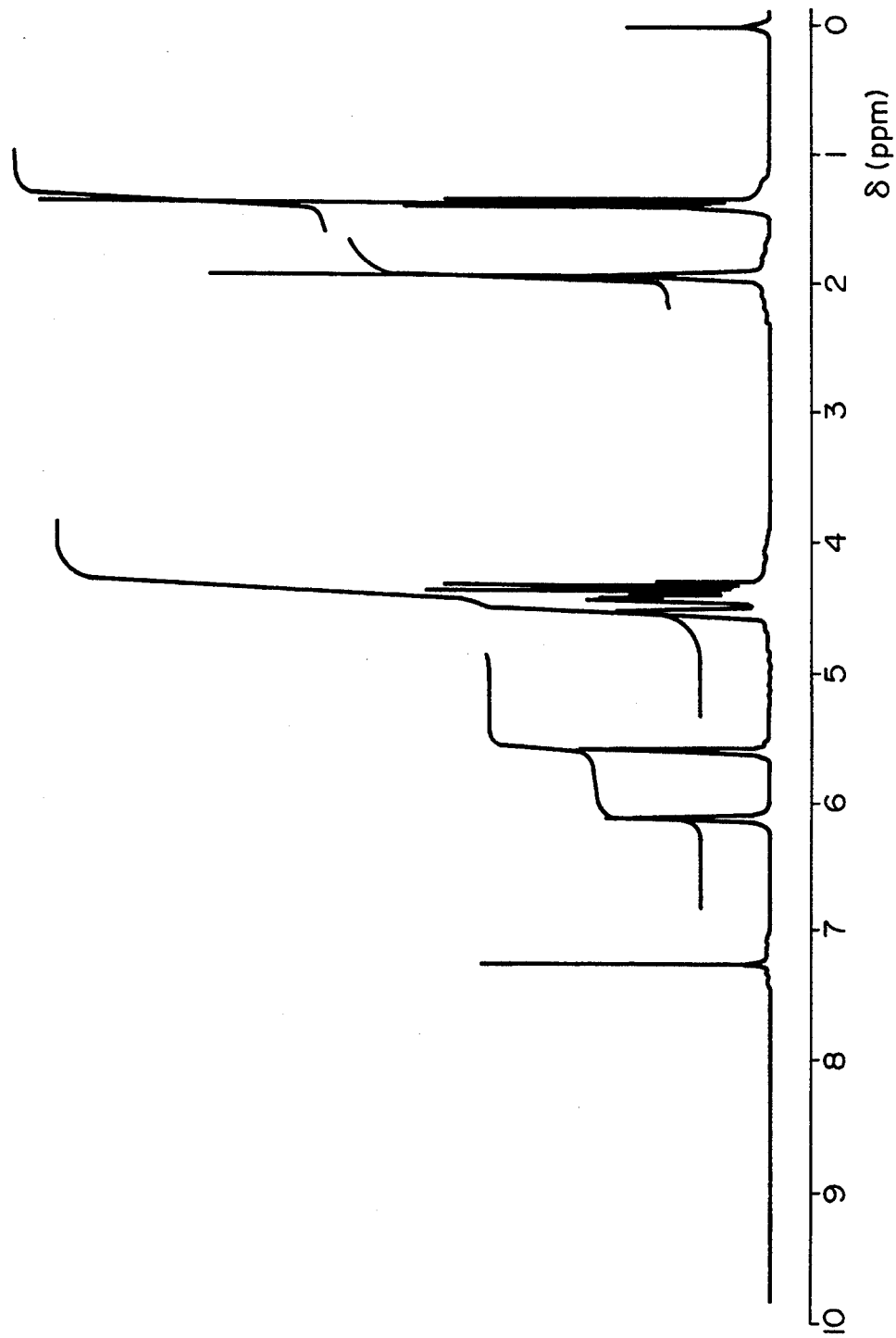
FIG. 9 is a $^1$H-NMR spectrum of Compound No. 19 (R=$CH_3$).

(1) $^1$NMR spectral data ($^1$NMR spectrum as shown in FIG. 9):

δ(CDCl$_3$): 6.12 (1H, t-like m), 5.59 (1H, quintet-like m), 4.53 (2H, m), 4.43 (2H, m), 4.35 (2H, q, J=6.02 Hz), 1.94 (3H, t-like m), 1.37 (3H, t, J=6.02 Hz).

Synthesis Example 6

Synthesis of N-methacryloyloxymethylphthalimide (Compound No. 20, R=CH₃)

A 20 ml pyridine solution of 9 g (50.8 mmol) of N-hydroxymethylphthalimide and 1 mg of hydroquinone was kept at about 0° C. in an ice bath, and 5.3 g (50.8 mmol) of methacryloyl chloride was added dropwise to the solution while stirring it well. After the dropwise addition was completed, the solution was stirred at this temperature for 30 minutes and then at room temperature for additional 30 minutes. The resulting reaction mixture was poured into icy water and stirred for a while. The precipitated solid was filtered and recrystallized from methanol to obtain 7.2 g of colorless crystals (yield: 58%). From their physical properties shown below, these crystals were confirmed to be N-methacryloyloxymethylphthalimide (Compound No. 20, R=CH₃).

Figure 10:
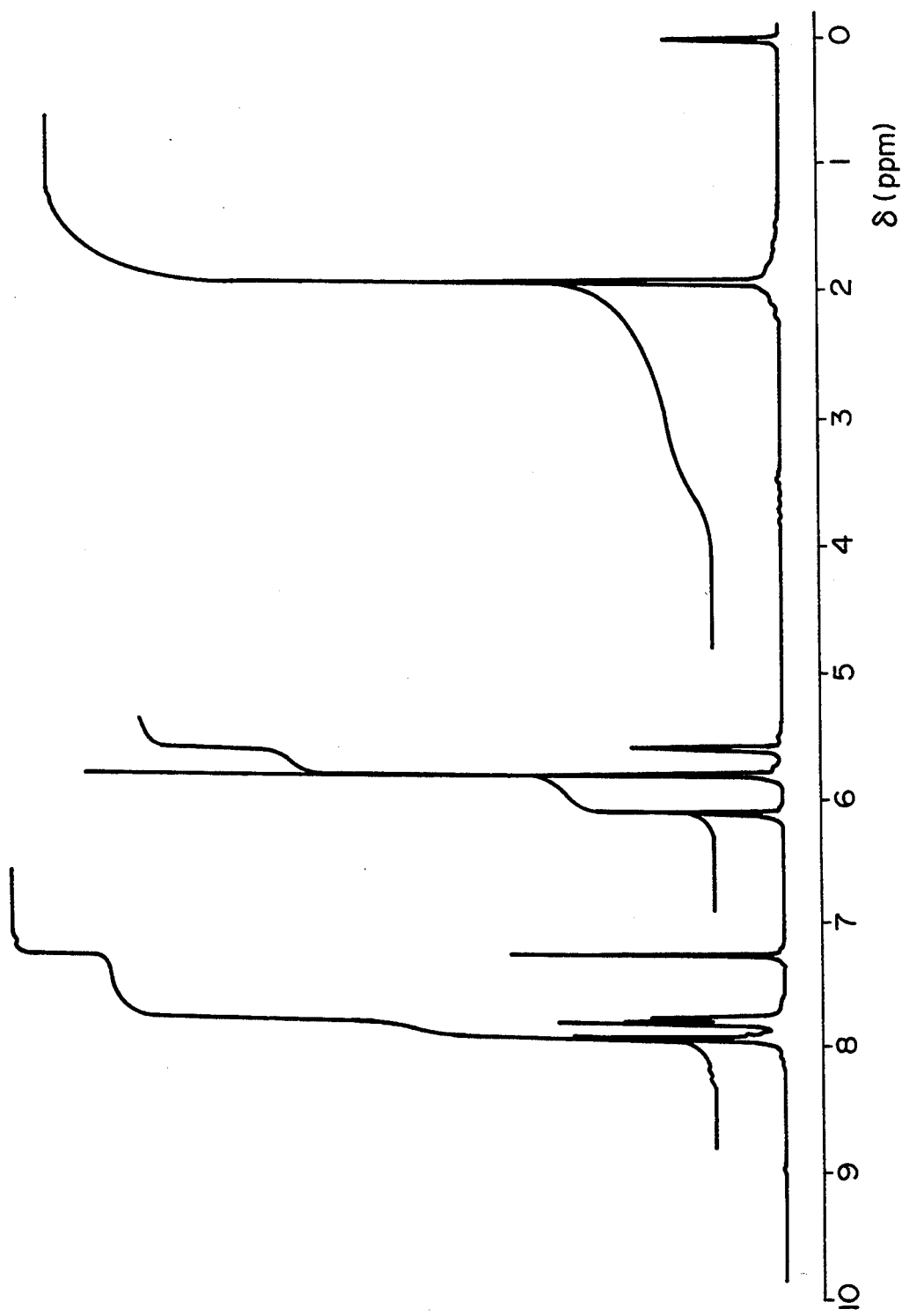
FIG. 10 is a $^1$H-NMR spectrum of Compound No. 20 (R=$CH_3$).
Figure 11:
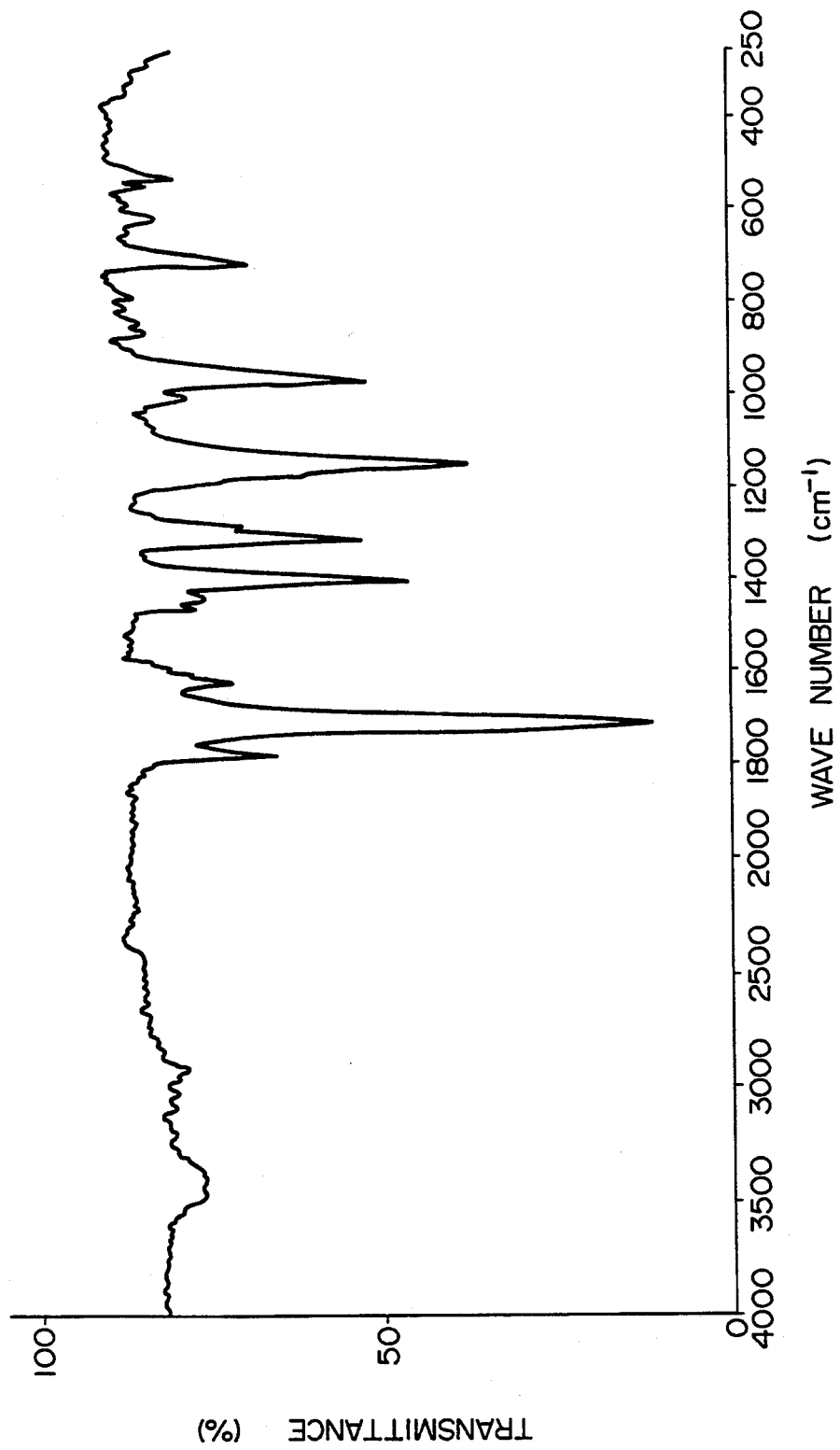
FIG. 11 is an IR spectrum of Compound No. 20 (R=$CH_3$).

(1) Melting point: 134° C.
(2) $^1$NMR spectral data ($^1$NMR spectrum as shown in FIG. 10):
 δ(CDCl₃): 7.94 (2H, m), 7.80 (2H, m), 6.12 (1H, t-like m), 5.80 (2H, s), 5.60 (1H, quintet-like m), 1.93 (3H, t-like m).
(3) IR spectral (KBr) data (IR spectrum as shown in FIG. 11):
 1785, 1715 cm⁻¹ (C=O).

Synthesis Example 7

Synthesis of N-methacryloyloxymethylsuccinimide (Compound No. 22, R=CH₃)

To a suspension, heated to 30° C., of 99.1 g (1.0 mol) of succinimide and 81 ml of formalin (37% formaldehyde solution), 3 ml of a 5 wt% aqueous solution of sodium hydroxide was added dropwise while well stirring the suspension. After the dropwise addition was completed, the mixture was further stirred at room temperature for 2.5 hours. After the reaction, water was distilled off under reduced pressure and the residual mixture was extracted with methylene chloride. The resulting methylene chloride solution was concentrated and the residual solid was recrystallized from ether to obtain 109 g of colorless crystals (yield: From their physical properties shown below, these crystals were confirmed to be N-hydroxymethylsuccinimide. These crystals were used for the following reaction without further parification.

Figure 12:
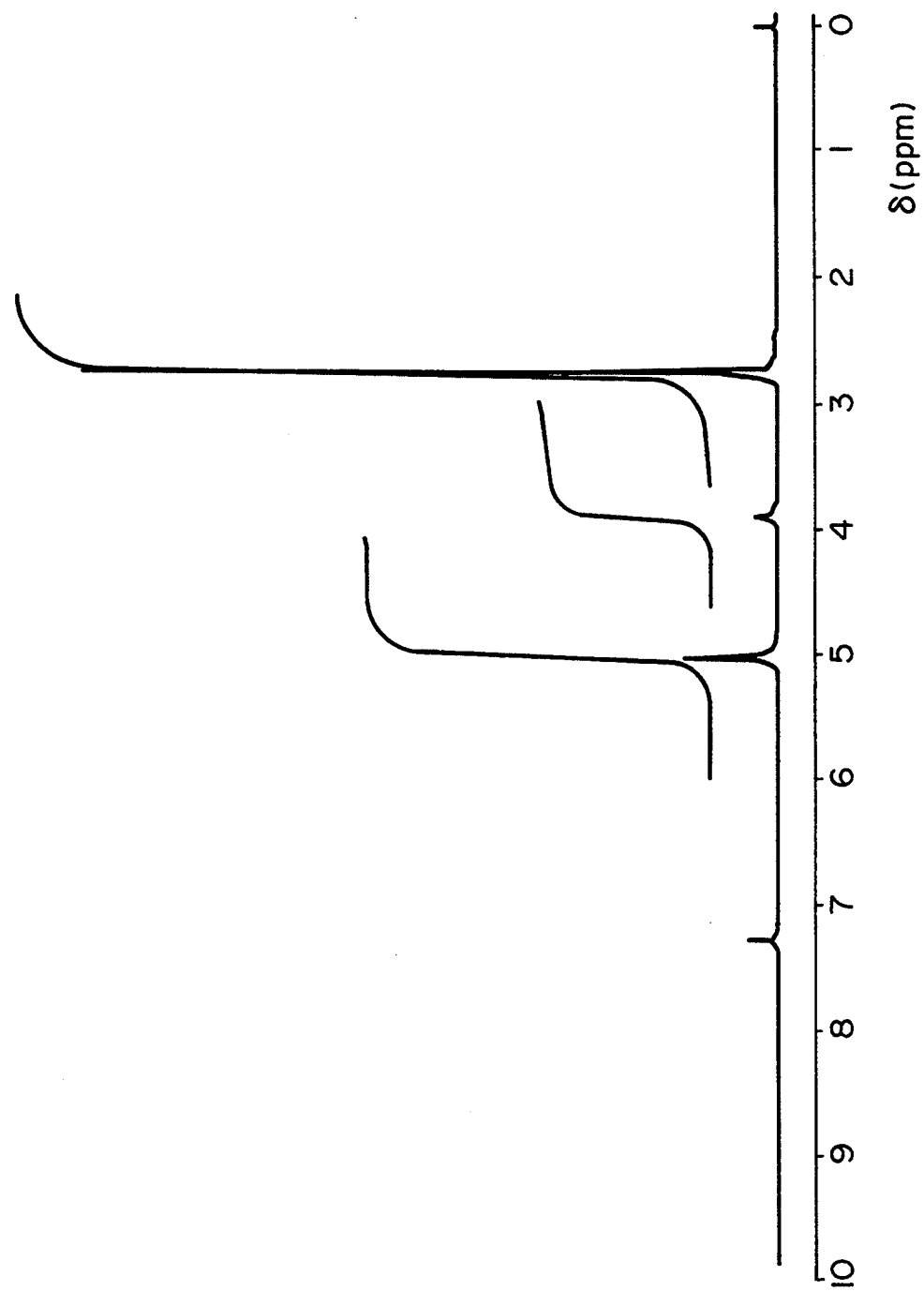
FIG. 12 is a $^1$H-NMR spectrum of N-hydroxymethylsuccinimide.

(1) Melting point: 64° C.
(2) $^1$H-NMR spectral data ($^1$NMR spectrum as shown in FIG. 12):
 δ(CDCl₃): 5.03 (2H, br-s), 3.90 (1H, br-s), 2.75 (4H, s).
(3) IR spectral data (KBr) (IR spectrum as shown in FIG. 13):
 1770, 1700 cm⁻¹ (C=O).

To a 236 ml methylene chloride solution of 30 g (232 mmol) of N-hydroxymethylsuccinimide synthesized in the manner described above, 20 g (232 mmol) of methacrylic acid and 10 mg of hydroquinonemonomethyl ether, 48 g (232 mmol) of dicyclohexylcarbodiimide (DCC) was added while cooling the solution in an ice bath. Then 2.84 g (23.2 mmol) of N,N-dimethylaminopyridine (DMAP) was further added to the solution with stirring. The mixture was further stirred at room temperature for 3 hours. The produced white precipitate was filtered off, the filtrate was concentrated and the residue was purified by silica gel column chromatography (eluent: hexane/ethyl acetate=1/1) to give 39.7 g of colorless crystals (yield: 87%). From their physical properties these crystals were identified to be N-methacryloyloxymethylsuccinimide (Compound No. 22, R=CH₃).

Figure 14:
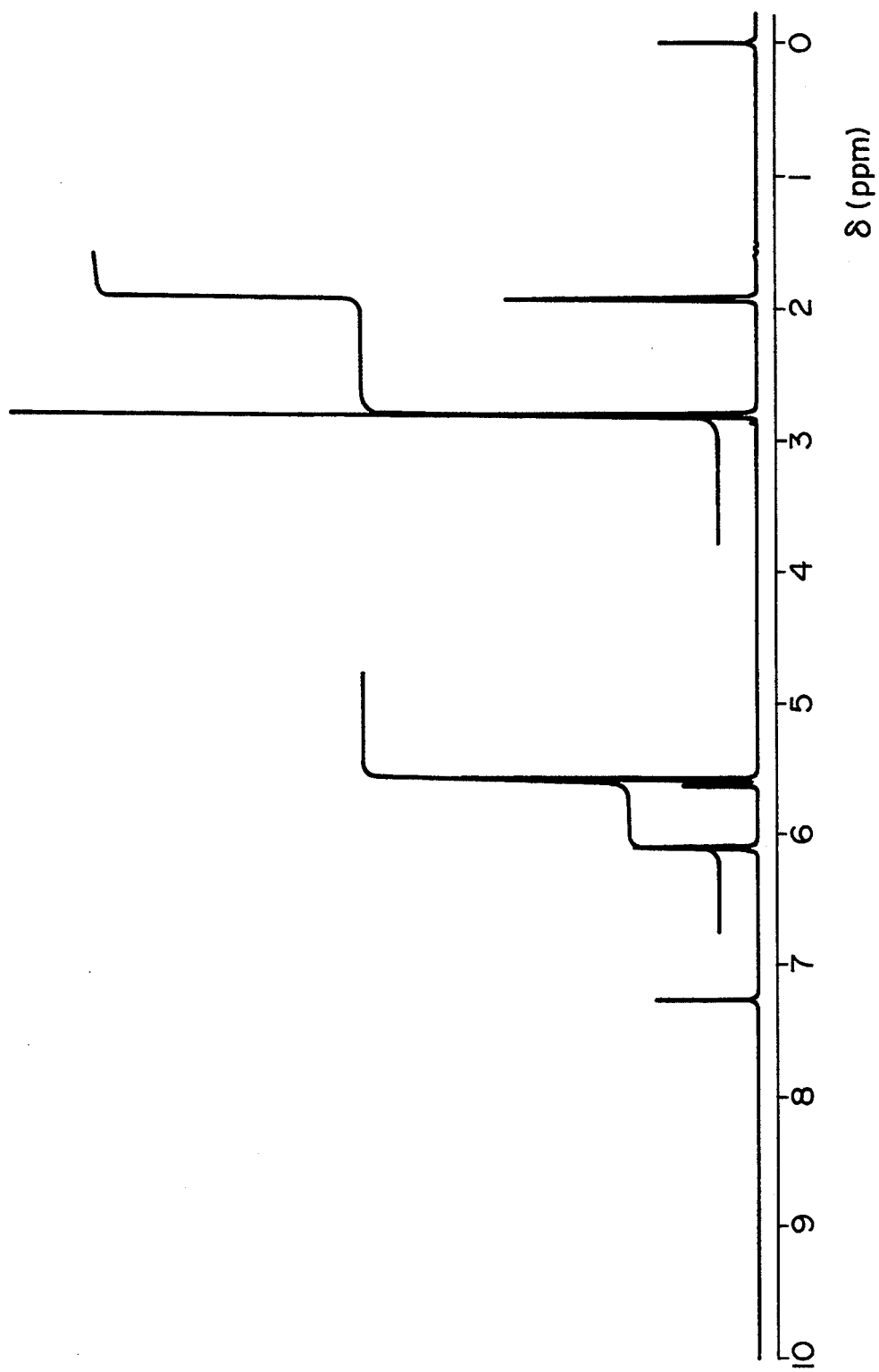
FIG. 14 is a $^1$NMR spectrum of Compound No. 22 (R=$CH_3$).
Figure 15:
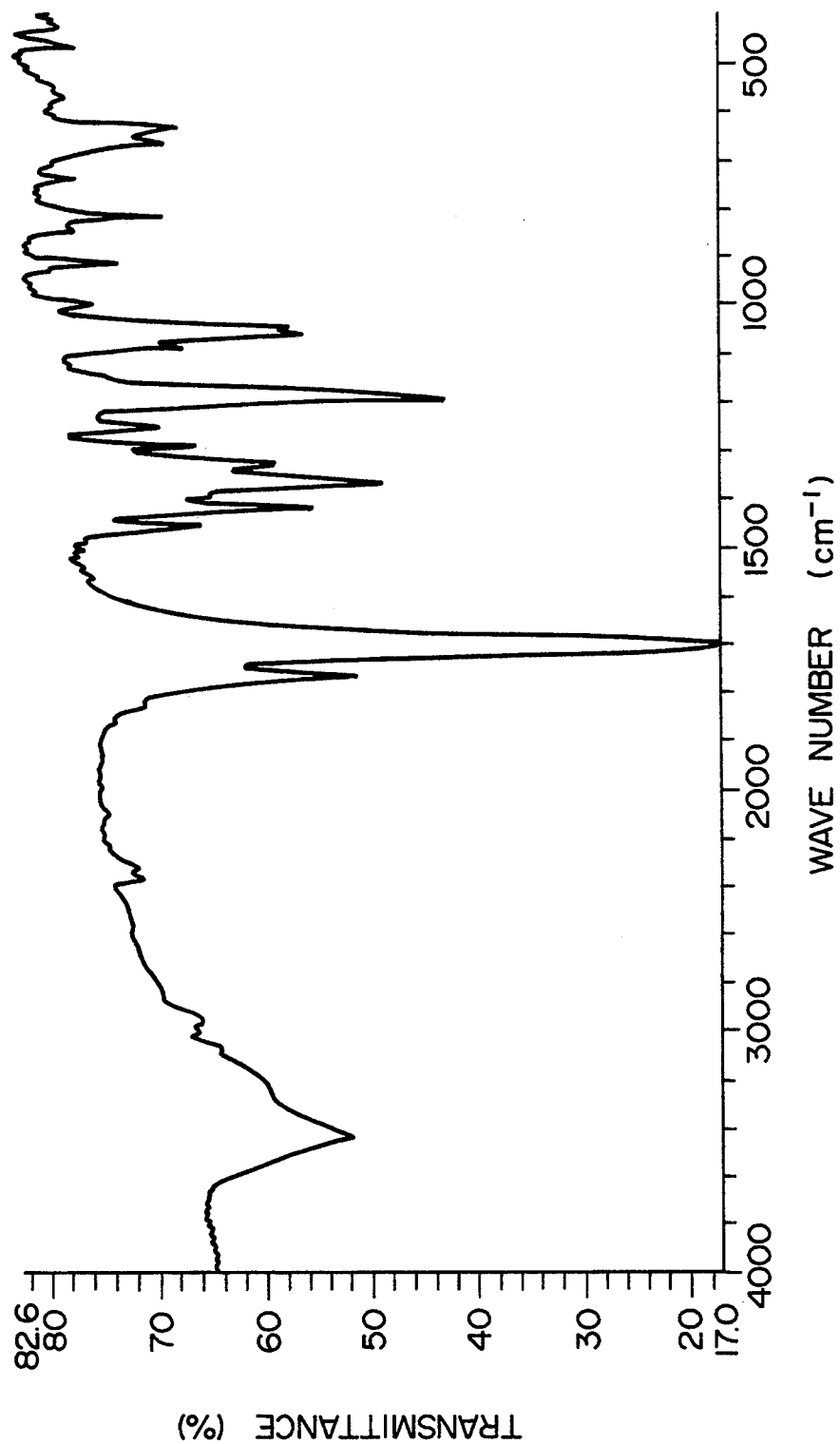
FIG. 15 is an IR spectrum of Compound No. 22 (R=$CH_3$).

(1) Melting point: 76° C.
(2) $^1$NMR spectral data ($^1$NMR spectrum as shown in FIG. 14):
 δ(CDCl₃): 6.11 (1H, t-like m), 5.62 (1H, quintet-like m), 5.59 (2H, s), 2.80 (4H, s), 1.93 (3H, t-like m).
(3) IR spectral data (KBr) (IR spectrum as shown in FIG. 15):
 1780, 1705 cm⁻¹ (C=O)

Synthesis Example 8

Synthesis of N-methacryloyloxysuccinimide (Compound No. 23, R=CH₃)

To a 250 ml methylene chloride suspension of 30 g (261 mmol) of N-hydroxysuccinimide, 22.4 g (261 mmol) of methacrylic acid and 10 mg of hydroquinonemonomethyl ether under cooling in an ice bath, 53.8 g (251 mmol) of DDC was added, followed by further addition of 3.2 g (26.1 mmol) of DMAP while well stirring the suspension. The mixture was further stirred at room temperature for hours. The produced white precipitate was filtered off, the filtrate was concentrated and the residue was purified by silica gel column chromatography (eluent: hexane/ethyl acetate=3/2) to obtain 14.7 g of colorless crystals (yield: 31%). From the following physical properties, these crystals were confirmed to be N-methacryloyloxysuccinimide (Compound No. 23, R=CH₃).

Figure 16:
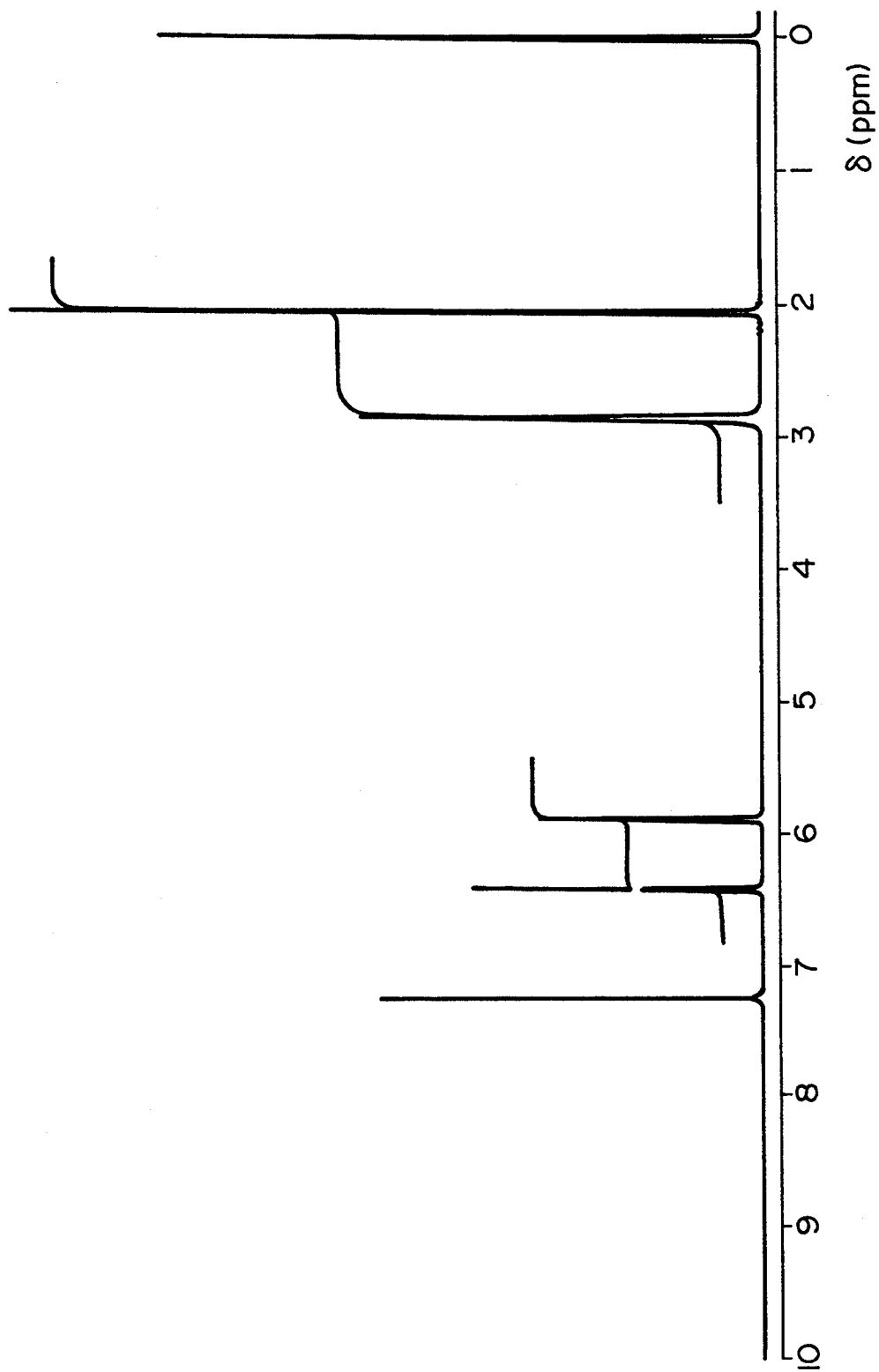
FIG. 16 is a $^1$NMR spectrum of Compound No. 23 (R=$CH_3$).
Figure 17:
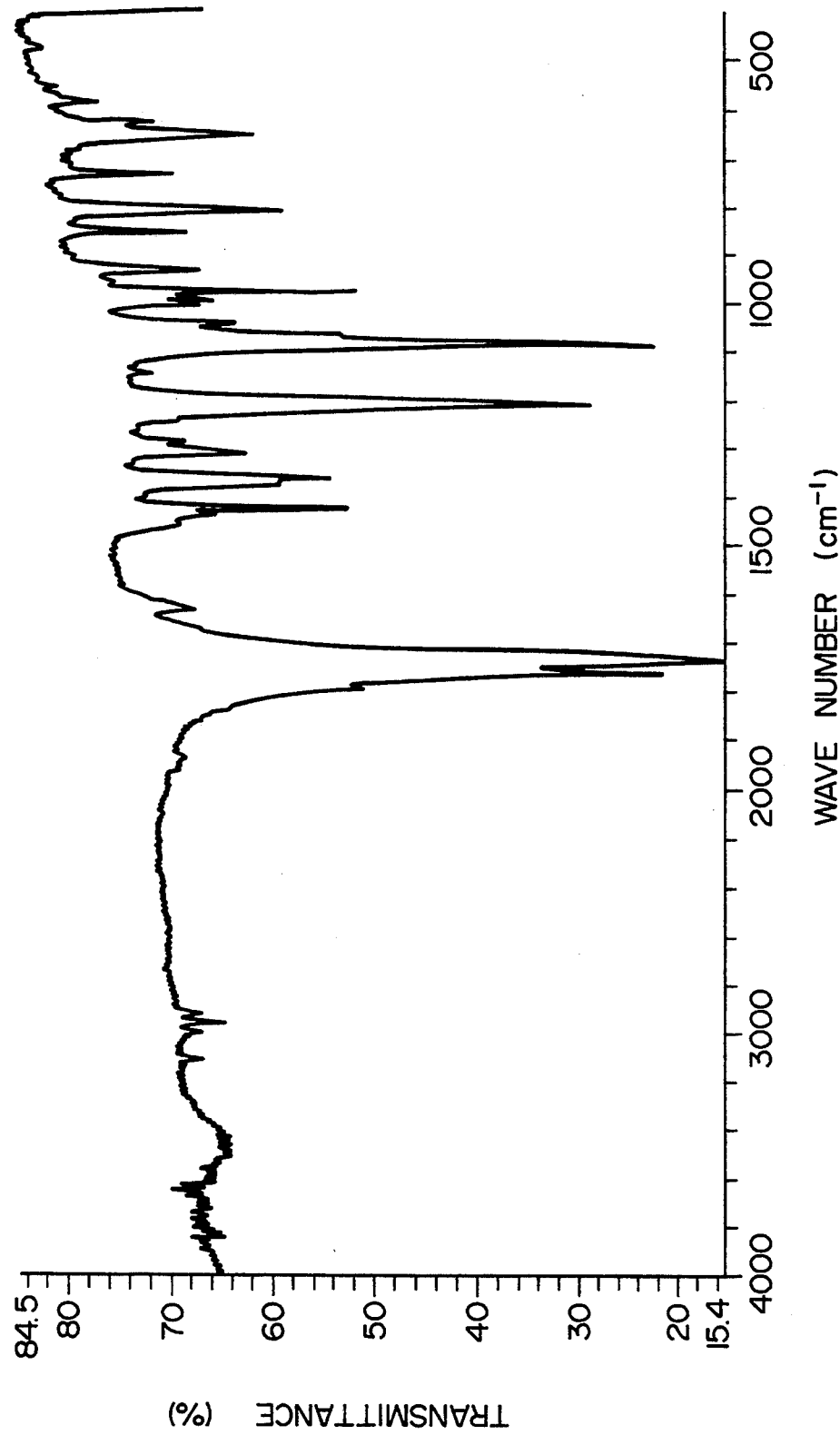
FIG. 17 is an IR spectrum of Compound No. 23 (R=$CH_3$).

(1) Melting point: 102° C.
(2) $^1$NMR spectral data ($^1$NMR spectrum as shown in FIG. 16):
(3) δ(CDCl₃): 6.42 (1H, t-like m), 5.89 (1H, m), 2.86 (4H, s), 2.06 (3H, t-like m).
(3) IR spectral data (KBr) (IR spectrum as shown in FIG. 17):
 1763, 1737 cm⁻¹ (C=O).

Synthesis Example 9

Synthesis of 4-pyridylmethyl methacrylate (Compound No. 26, R=CH₃)

A mixture of 25 g (82.5 mmol) of 4-pyridylmethanol, 91.7 g (330 mmol) of methyl methacrylate, 5 mg of hydroquinone and 0.5 g (1.38 mmol) of dioctyltin oxide was reacted at 100° C. for 24 hours under air bubbling with removal of methanol produced. After the reaction, excess methyl methacrylate was distilled off under reduced pressure and the precipitated solid was filtered off. The filtrate was purified by silica gel column chromatography (eluent: ethyl acetate) to obtain 39.2 g of a light-red liquid (yield: 97%). From its physical properties shown below, this liquid was confirmed to be 4-pyridylmethyl methacrylate (Compound No. 26, R=CH₃).

Figure 18:
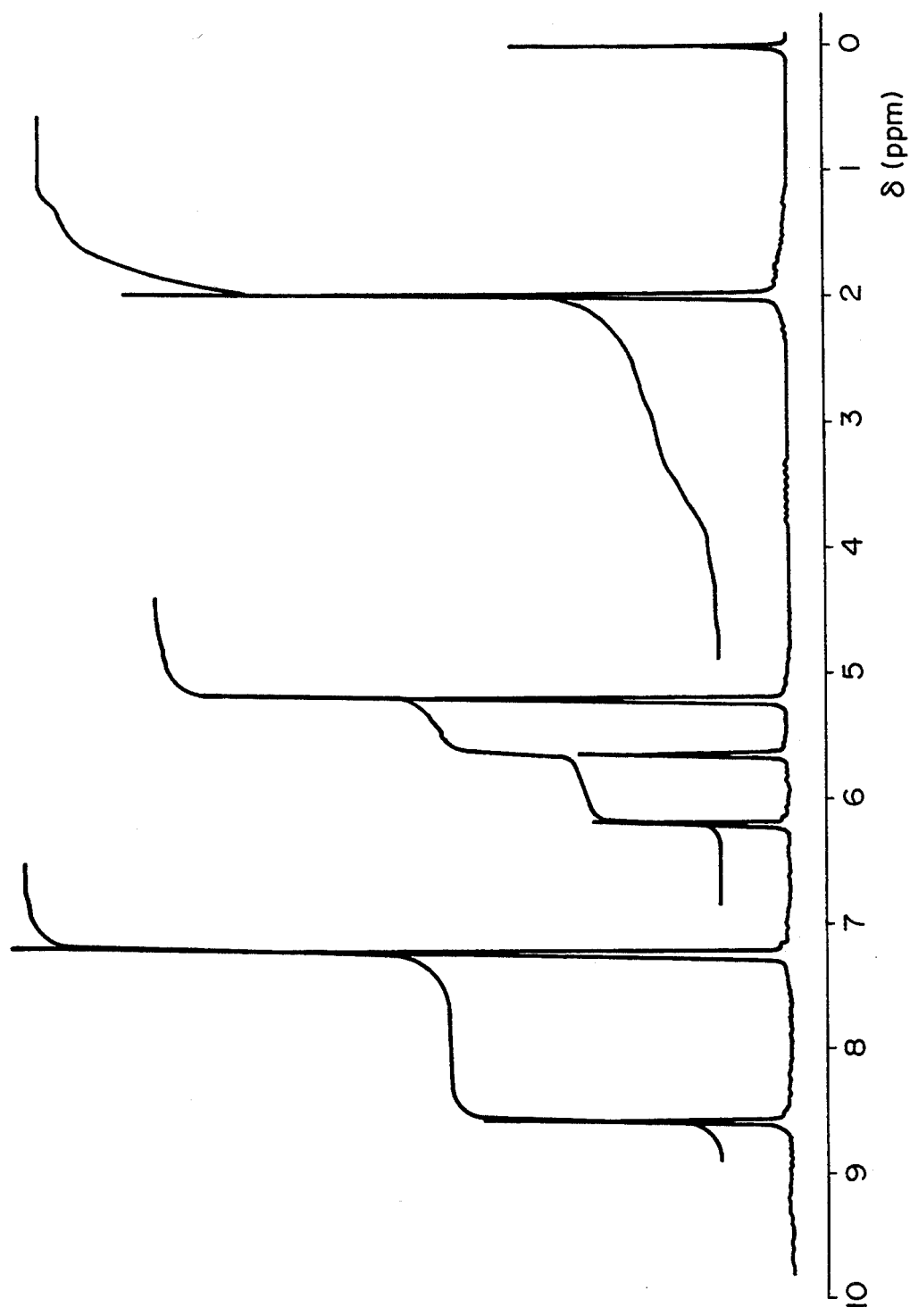
FIG. 18 is a $^1$NMR spectrum of Compound No. 26 (R=$CH_3$).
Figure 19:
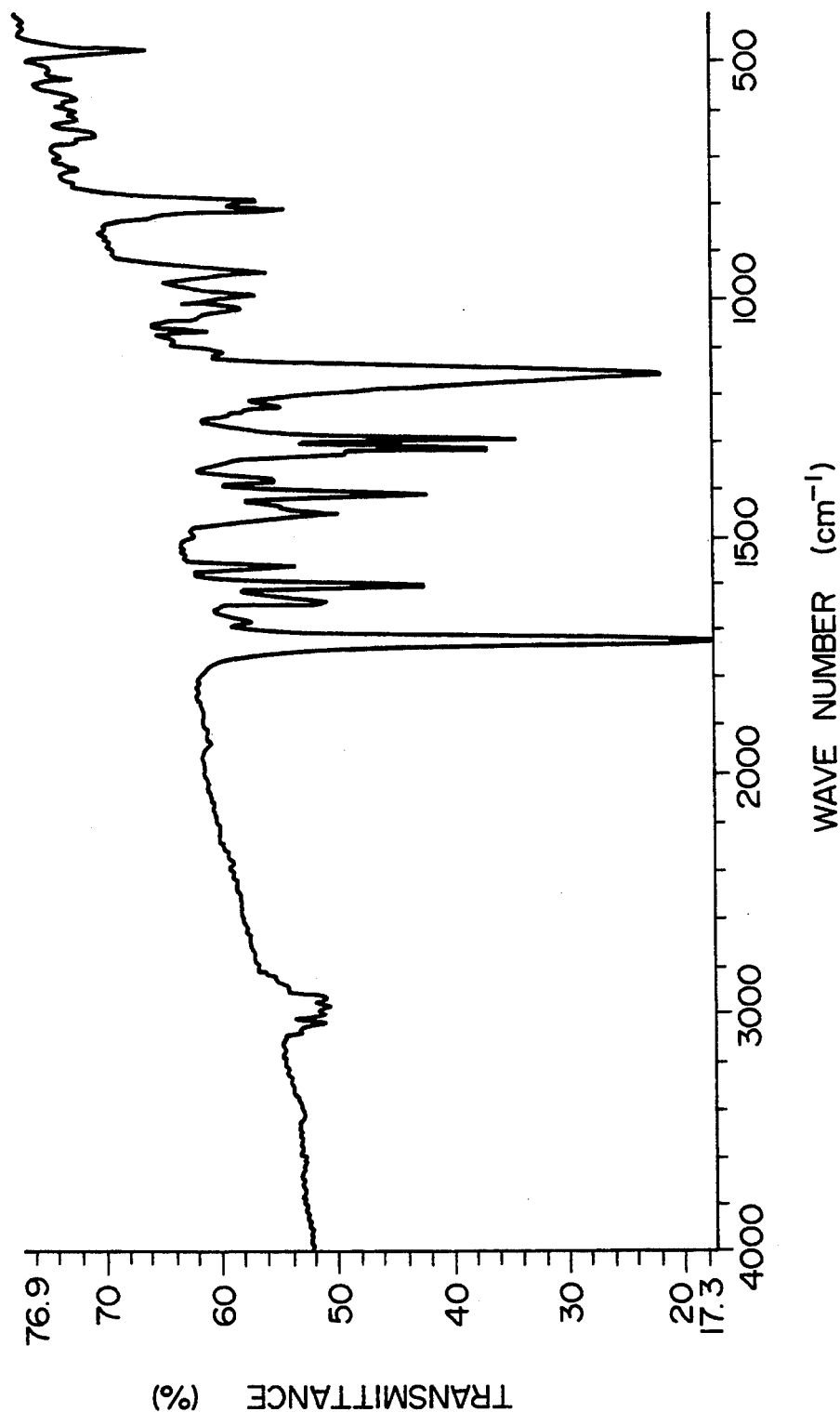
FIG. 19 is an IR spectrum of Compound No. 26 (R=$CH_3$).

(1) $^1$NMR spectral data ($^1$NMR spectrum as shown in FIG. 18):
(2) δ(CDCl₃): 8.61 (2H, d, J=6.10 Hz), 7.27 (2H, d, J=6.10 Hz), 6.22 (1H, t-like m), 5.66 (1H, quintet-like m), 5.22 (2H, s), 2.01 (3H, t-like m).
(2) IR spectral (neat) data (IR spectrum as shown in FIG. 19):
 1720 cm⁻¹ (C=0).

Synthesis Example 10

Synthesis of 2-methylsulfonylethyl methacryalte
(Compound No. 9, R=CH$_3$)

A mixture of 315 g (3.15 mol) of methyl methacryalte, 130 g (1.05 mol) of 2-methylsulfonylethanol, 7.8 g (27.4 mmol) of titanium tetraisopropoxide and 0.15 g of hydroquinone was reacted at 100° C. for 3 hours under air bubbling with removal of methanol produced. After cooling, 20 ml of water was added, to the reaction mixture and the resulting mixture was stirred at 80° C. for 20 minutes. After removal of the aqueous layer, 200 ml of water was further added to the organic layer and the resulting mixture was extracted with chloroform. The chloroform solution was dried over anhydrous sodium sulfate and was concentrated under reduced pressure to obtain 130 g of colorless crystals (yield: 64%). From their physical properties, these crystals were confirmed to be 2-methylsulfonylethyl methacrylate (Compound No. 9, R=CH$_3$).

Figure 20:
FIG. 20 is a $^1$NMR spectrum of Compound No. 9 (R=$CH_3$).

(1) Melting point: 48° C.
(2) $^1$NMR spectral data ($^1$NMR spectrum as shown in FIG. 20):

(3) δ(CDCl$_3$): 6.14 (1H, t-like m), 5.66 (1H, quintet-like m), 4.62 (2H, t, J=5.90 Hz), 3.38 (2H, t, J=5.90 Hz), 2.99 (3H, s), 1.96 (3H, t-like m).

Figure 21:
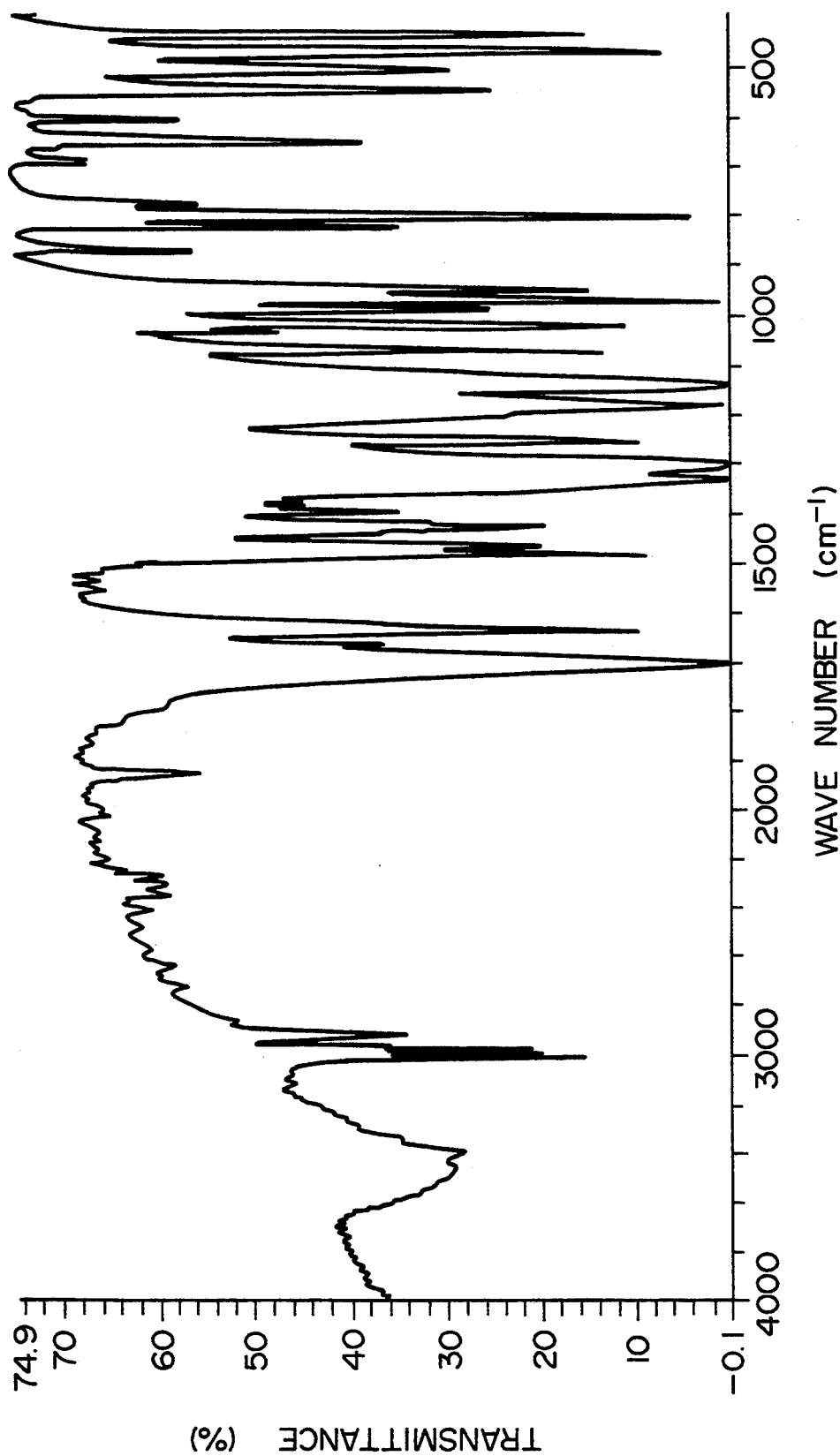
FIG. 21 is an IR spectrum of Compound No. 9 (R=$CH_3$).

(3) IR spectral data (KBr) (IR spectrum as shown in FIG. 21):
1710 cm$^{-1}$ (C=O), 1300, 1140 cm$^{-1}$ (SO$_2$).

Examples 1–20

Into a four-necked flask equipped with a stirrer, a condenser, an N$_2$ gas feed pipe, a dropping funnel and a thermometer, a measured amount of a solvent or solvents was supplied and stirred at 95° C. Then a mixed solution comprising monomers, azobisisobutyronitrile (AIBN) and α-methylstyrene dimer (αMSD) was charged into the dropping funnel and added dropwise into the flask in an N$_2$ gas stream while maintaining the temperature of the reaction mixture at about 95° C. and stirring the mixture. After the dropwise addition was completed, the mixture was further stirred at 95° C. for 6 hours to obtain a viscous liquid with a specified solid content. The detailed experimental conditions and the properties of the obtained resins are shown in Tables 1 to 3.

TABLE 1

| Example No. | Solvent (g) | Formulation Monomers (g) | AIBN (g) | αMSD (g) | NV (%) | Mn |
|---|---|---|---|---|---|---|
| 1 | Dioxane (60) | 2-Cyanoethyl methacrylate (69.6) (Compound No. 2, R=CH$_3$) n-Butyl acrylate (32) Ethyl methacrylate (28.5) | 1.5 | 0.5 | 50 | 9400 |
| 2 | Methyl isobutyl ketone (MIBK) (36) | 2-Cyanoethyl acrylate (20) (Compound No. 2, R=H) Methyl methacrylate (16) | 1.1 | 0.36 | 60 | 8100 |
| 3 | Xylene (40) n-Butanol (10) | 2-Cyanoethyl acrylate (26) (Compound No. 2, R=H) tert-Butyl methacrylate (11.8) (Compound No. 39, R=CH$_3$) Methyl methacrylate (12.4) | 1.66 | 0.55 | 50 | 7000 |
| 4 | Xylene (40) n-Butanol (10) | 2-Cyanoethyl acrylate (24.5) (Compound No. 2, R=H) tert-Butyl methacrylate (8.4) (Compound No. 39, R=CH$_3$) Compound No. 46, R=CH$_3$ (7.4) Methyl methacrylate (9.8) | 1.57 | 0.55 | 50 | 7000 |
| 5 | Dioxane (165) | Compound No. 10, R=CH$_3$ (103) n-Butyl acrylate (32) Ethyl methacrylate (28.5) | 1.5 | 0.5 | 50 | 9100 |
| 6 | Xylene (40) n-Butanol (10) | Compound No. 10, R=CH$_3$ (30) tert-Butyl methacrylate (12) (Compound No. 39, R=CH$_3$) Methyl methacrylate (3) Compound No. 46, R=CH$_3$ (5) | 1.6 | 0.55 | 50 | 7600 |
| 7 | Dioxane (60) | Compound No. 19, R=CH$_3$ (29.4) n-Butyl acrylate (12.4) Ethyl methacrylate (18.6) | 1.5 | 0.55 | 50 | 9200 |

FIG. 20):

TABLE 2

| Example No. | Solvent (g) | Formulation Monomers (g) | AIBN (g) | αMSD (g) | NV (%) | Mn |
|---|---|---|---|---|---|---|
| 8 | Dioxane (58.6) | Compound No. 18, R=CH$_3$ (22.1) n-Butyl acrylate (13.1) Ethyl methacrylate (23.4) | 1.5 | 0.55 | 50 | 9400 |
| 9 | Xylene (40) | Compound No. 2, R=H (8.0) Compound No. 40, R=CH$_3$ (32.1) | 1.2 | 0.4 | 50 | 7200 |
| 10 | Xylene (40) | Compound No. 2, R=H (9.1) Compound No. 39, R=CH$_3$ (30.9) | 1.2 | 0.4 | 50 | 7300 |
| 11 | Xylene (40) | Compound No. 2, R=H (7.7) Compound No. 41, R=CH$_3$ (32.3) | 1.2 | 0.4 | 50 | 7100 |
| 12 | Xylene (40) | Compound No. 2, R=H (9.1) Compound No. 38, R=CH$_3$ (30.9) | 1.2 | 0.4 | 50 | 7200 |

TABLE 2-continued

| Example No. | Solvent (g) | Formulation Monomers (g) | AIBN (g) | αMSD (g) | NV (%) | Mn |
|---|---|---|---|---|---|---|
| 13 | Xylene (40) | Compound No. 2, R=H (18.7) Compound No. 39, R=CH₃ (21.3) | 1.2 | 0.4 | 50 | 7400 |
| 14 | Xylene (40) | Compound No. 2, R=H (19.3) Compound No. 39, R=CH₃ (17.6) Methyl methacrylate (3.1) | 1.2 | 0.4 | 50 | 7400 |
| 15 | Xylene (32) n-Butanol (8) | Compound No. 2, R=H (20.0) Compound No. 39, R=CH₃ (13.6) Methyl methacrylate (6.4) | 1.3 | 0.4 | 50 | 7300 |
| 16 | Xylene (32) n-Butanol (8) | Compound No. 2, R=H (20.3) Compound No. 39, R=CH₃ (11.5) Methyl methacrylate (8.1) | 1.2 | 0.4 | 50 | 7300 |
| 17 | Xylene (40) n-Butanol (10) | Compound No. 2, R=H (25.9) Compound No. 39, R=CH₃ (11.8) Methyl methacrylate (12.4) | 1.66 | 1.2 | 50 | 6400 |
| 18 | Xylene (40) n-Butanol (10) | Compound No. 2, R=H (25.9) Compound No. 39, R=CH₃ (11.8) Methyl methacrylate (12.4) | 1.66 | 1.66 | 50 | 5800 |

TABLE 3

| Example No. | Solvent (g) | Formulation Monomers (g) | AIBN (g) | αMSD (g) | NV (%) | Mn |
|---|---|---|---|---|---|---|
| 19 | Dioxane (53.7) | Compound No. 26, R=CH₃ (22.7) n-Butyl acrylate (12.4) Ethyl methacrylate (18.6) | 1.5 | 0.55 | 50 | 8400 |
| 20 | Dioxane (54.6) | Compound No. 27, R=CH₃ (18.1) n-Butyl acrylate (13.1) Ethyl methacrylate (23.4) | 1.5 | 0.55 | 50 | 8200 |

Examples 21–26

A solvent, monomers, AIBN and αMSD were put into a four-necked flask equipped with a stirrer, a condenser, an N₂ gas feed pipe, and a thermometer, and the mixture was stirred while bubbling with N₂ gas with keeping the reaction temperature about 95° C. After the initial vigorous exothermic reaction abated, the reaction mixture was further stirred under the above conditions for 6 hours. There was consequently obtained a viscous liquid with a specified solid content. The detailed experimental conditions and the properties of the obtained resins are shown in Table 4.

Examples 27–30

Measured amounts of a solvent and a lowly reactive monomer were placed in a four-necked flask equipped with a stirrer, a condenser, an N₂ gas feed pipe, a dropping funnel and a thermometer, and the mixture was kept therein with stirring. Then, a mixed solution of other monomers, AIBN and αMSD was supplied into the flask from the dropping funnel in an N₂ gas stream with stirring the mixture and maintaining its temperature at about 95° C. After completion of the dropwise addition, the reaction mixture was stirred at 95° C. for 1 hour. A mixture of AIBN and xylene or xylene alone

TABLE 4

| Example No. | Solvent (g) | Formulation Monomers (g) | AIBN (g) | αMSD (g) | NV (%) | Mn |
|---|---|---|---|---|---|---|
| 21 | Dioxane (150) | Compound No. 7, R=CH₃ (89) n-Butyl acrylate (32) Ethyl methacrylate (28.5) | 1.5 | 0.5 | 50 | 9400 |
| 22 | Dioxane (155) | Compound No. 9, R=CH₃ (96) n-Butyl acrylate (32) Ethyl methacrylate (28.5) | 1.5 | 0.5 | 50 | 8500 |
| 23 | Dioxane (196) | Compound No. 12, R=CH₃ (134) n-Butyl acrylate (32) Ethyl methacrylate (28.5) | 1.5 | 0.5 | 50 | 9700 |
| 24 | Dioxane (200) | Compound No. 15, R=CH₃ (141) n-Butyl acrylate (32) Ethyl methacrylate (28.5) | 1.5 | 0.5 | 50 | 8800 |
| 25 | Dioxane (62.4) | Compound No. 20, R=CH₃ (31.4) n-Butyl acrylate (12.4) Ethyl methacrylate (18.6) | 1.5 | 0.55 | 50 | 8500 |
| 26 | Dioxane (56.6) | Compound No. 22, R=CH₃ (20.1) n-Butyl acrylate (13.1) Ethyl methacrylate (23.4) | 1.5 | 0.55 | 50 | 8100 | was added dropwise to the mixture one to three times every 30 minutes. The reaction mixture was further stirred at 95° C. for 6 hours to obtain a viscous liquid with a specified solid content. The detailed experimental conditions and the properties of the obtained resins are shown in Table 5.

stirring the mixture and maintaining its temperature at about 95° C. After completion of the dropwise addition, the reaction mixture was further stirred at 95° C. for 6 hours to obtain a viscous liquid with a specified solid content. The detailed experimental conditions and the properties of the obtained resins are shown in Table 6.

TABLE 5

| Example No. | Formulation in reactor: Monomer (g) and solvent (g) | Formulation in dropping funnel Monomers (g) or solvent (g) | AIBN (g) | αMSD (g) | NV (%) | Mn |
|---|---|---|---|---|---|---|
| 27 | Xylene (40) Maleic anhydride (12) | 1st: Compound No. 2, R=H (10) Compound No. 39, R=CH$_3$ (11) n-Butyl methacrylate (17) 2nd: Xylene (10) | 0.5 0.2 | 0.55 — | 50 | 11300 |
| 28 | Xylene (40) Maleic anhydride (13.6) | 1st: Compound No. 2, R=CH$_3$ (5.5) Compound No. 39, R=CH$_3$ (14) n-Butyl methacrylate (16.9) 2nd: Xylene | 0.5 0.2 | 0.55 — | 50 | 10100 |
| 29 | Xylene (40) Maleic anhydride (15) | 1st: Compound No. 10, R=CH$_3$ (7.8) Compound No. 38, R=CH$_3$ (16.3) n-Butyl methacrylate (10.9) 2nd: Xylene (10) | 1.4 0.2 | 0.55 — | 50 | 7100 |
| 30 | Xylene (63) Maleic anhydride (29.4) | 1st: Compound No. 2, R=H (25) n-Butyl methacrylate (71) 2nd: Xylene (12.5) 3rd: Xylene (12.5) 4th: Xylene (37.5) | 1.25 0.25 0.25 — | 0.5 — — — | 50 | 22000 |

TABLE 6

| Comp. Prep. Ex. No. | Solvent (g) | Formulation Monomers (g) | AIBN (g) | αMSD (g) | NV (%) | Mn |
|---|---|---|---|---|---|---|
| 1 | Xylene (50) | Tributyltin methacrylate (25.6) n-Butyl acrylate (8.8) Ethyl methacrylate (15.6) | 0.75 | 0.5 | 50 | 7500 |
| 2 | Xylene (50) | 2,2,2-Trifluoroethyl methacrylate (29.1) n-Butyl acrylate (11.1) Ethyl methacrylate (9.9) | 1.5 | 0.5 | 50 | 7200 |

As seen from Examples 3, 4, 6, 9-18 and 27-30, the copolymers obtained by using the unsaturated monomers represented by the formula (II) are soluble in solvents, especially aromatic solvents such as xylene and xylene/n-butal (4/1), and suited for use as a resin for antifouling paints.

Comparative Preparation Example 1

A determined amount of a solvent was put into a four-necked flask equipped with a stirrer, a condenser, an N$_2$ gas feed pipe, a dropping funnel and a thermometer, and the solvent was kept at 95° C. with stirring. Then a mixed solution of the monomers, AIBN and αMSD was supplied into the dropping funnel and added dropwise into the flask under N$_2$ gas stream with Comparative Preparation Example 3

A solvent, monomers, AIBN and αMSD were supplied into a four-necked flask equipped with a stirrer, a condenser, an N$_2$ gas feed pipe, and a thermometer, and the mixture was stirred while bubbling with N$_2$ gas with keeping the reaction temperature about 95° C. After the initial vigorous exothermic reaction abated, the mixture was further stirred under the above conditions for 6 hours to obtain a viscous liquid with a specified solid content. The detailed experimental conditions and the properties of the obtained resins are shown in Table 7.

TABLE 7

| Comp. Prep. Ex. No. | Solvent (g) | Formulation Monomers (g) | AIBN (g) | αMSD (g) | NV (%) | Mn |
|---|---|---|---|---|---|---|
| 3 | Dioxane (117) | p-Nitrophenyl methacrylate (31.4) n-Butyl acrylate (9.8) Ethyl methacrylate (8.7) | 1.5 | 0.5 | 30 | 12600 |

Test Example

Each of the varnish formulations obtained in the Examples and the Comparative Preparation Examples described above was coated on a 150 mm×100 mm polypropylene plate. The coating thickness was about 50 μm. The coated polypropylene plate was heated at 80° C. for 3 hours to perfectly remove the solvent in the coat and the initial weight of the plate was measured. Then the coated polypropylene plate was immersed in 1,750 ml of an alkaline buffer solution with a pH of 10.2. After left in said buffer solution at 45° C. for 24 hours, the polypropylene plate was taken out, washed with water and dried, followed by measurement of the final weight of the plate. The rate of decrease of the coating after said immersion was determined from the difference between the initial weight (weight before immersion) and the final weight (weight after immersion) of the plate.

For the sake of comparison, the above test was also conducted on the organotin-containing resin obtained in Comparative Preparation Example 1 and the resin disclosed in Japanese Patent Application Publication No. 60-500452 (Comparative Preparation Examples 2 and 3) proposed as a substitute for said organotin-containing resin. The test results are shown in Table 8.

TABLE 8

| Varnish | Loss in weight of the coat (mg/100 cm$^2$) |
| --- | --- |
| Example 1 | 21 |
| Example 2 | 32 |
| Example 3 | 27 |
| Example 4 | 30 |
| Example 5 | 53 |
| Example 6 | 42 |
| Example 7 | 7 |
| Example 8 | 7 |
| Example 15 | 20 |
| Example 20 | 7 |
| Example 21 | 76 |
| Example 22 | 63 |
| Example 23 | 60 |
| Example 24 | 97 |
| Example 25 | 14 |
| Example 26 | 8 |
| Example 27 | 67 |
| Example 28 | 51 |
| Example 29 | 59 |
| Example 30 | 92 |
| Comp. Prep. Example 1 | 17 |
| Comp. Prep. Example 2 | 5 |
| Comp. Prep. Example 3 | 6 |

As noted from the foregoing results, the coating resin compositions according to the present invention are equal to or higher than the organotin-containing resin in rate of decrease of coating, and needless to say, they are free of toxicity possessed by organotin. It was also found that the resin compositions of this invention are superior to the resins disclosed in Japanese Patent Application Publication No. 60-500452, which were proposed as a substitute material for the organotin-based resin, in rate of decrease of coating and useful as a resin for antifouling paints. Antifouling Performance Test Paints were prepared by blending 40 parts by weight of cuprous oxide and 3 parts by weight of ZnO with 15 parts by weight (as solid) of the resin varnishes synthesized in the Examples described above. Each of these paints was spray coated on both sides of a coated steel plate (100×200×1 mm) which had been applied with an anticorrosive coating. Said spray coating was conducted twice so that the dry coating thickness on each side would become 100 μm, thereby preparing the test plates.

Each of the test plates was subjected to a sea water immersion test at Nakaminato Port of Nakaminato City, Ibaragi Pref., and the number of the shellfishes (barnacles) attached to the test plate was counted periodically. The results are shown in Table 9.

TABLE 9

| Antifouling performance test Run No. | Resin varnish (Example No.) | Number of barnacles attached to test plate Period of immersion | | | |
| --- | --- | --- | --- | --- | --- |
| | | 0 | 2 months | 4 months | 6 months |
| 1 | 3 | 0 | 0 | 0 | 1 |
| 2 | 4 | 0 | 0 | 0 | 0 |
| 3 | 5 | 0 | 0 | 0 | 0 |
| 4 | 6 | 0 | 0 | 0 | 0 |
| 5 | 17 | 0 | 0 | 0 | 1 |
| 6 | 21 | 0 | 0 | 0 | 0 |
| 7 | 23 | 0 | 0 | 0 | 0 |
| 8 | 24 | 0 | 0 | 0 | 1 |
| 9 | 27 | 0 | 0 | 0 | 1 |
| 10 | 28 | 0 | 0 | 0 | 0 |
| 11 | 29 | 0 | 0 | 0 | 0 |
| 12 | 30 | 0 | 0 | 0 | 0 |

Comparative Antifouling Performance Test

The same antifouling performance test as described above was conducted on the resin varnishes synthesized in Comparative Preparation Examples 2 and 3. The results are shown in Table 10.

TABLE 10

| Comparative antifouling Performance test Run No. | Resin varnish (Comp. Prep. Example No.) | Number of barnacles attached to test plate Period of immersion | | | |
| --- | --- | --- | --- | --- | --- |
| | | 0 | 2 months | 4 months | 6 months |
| 1 | 2 | 0 | 9 | 17 | 24 |
| 2 | 3 | 0 | 10 | 19 | 31 |

As noted from the results of the antifouling performance tests shown above, any of the paints prepared by using the resin compositions according to the present invention showed excellent antifouling performance, substantially precluding attachment of barnacles to the plate applied with the paint.

Viscosity Stability Test

A mixture of 100 parts by weight of cuprous oxide and 100 parts by weight of resin solid of each of the resin varnishes selected from those synthesized in the above Examples was kneaded into a paste, and the paste was transferred into a 150 ml sample bottle and its viscosity was measured by a Brookfield viscometer. Further, after sealing the sample bottle, it was stored in a thermostatic chamber of 40° C. for 20 days and then the viscosity of the paste was measured in the same way. The rate of change of viscosity after storage was determined from the following equation (1). The test results are shown in Table 11.

$$\text{Rate of change of viscosity} = \frac{\text{Viscosity after storage}}{\text{Viscosity before storage}} \qquad (1)$$

TABLE 11

| Viscosity stability test Run No. | Resin varnish (Example No.) | Rate of change of Viscosity (after left at 40° C. for 20 days |
|---|---|---|
| 1 | 3 | 1.04 |
| 2 | 4 | 1.03 |
| 3 | 5 | 1.07 |
| 4 | 23 | 1.05 |
| 5 | 27 | 1.10 |
| 6 | 28 | 1.12 |

It is seen from the above results that the rate of change of viscosity of the coating resin composition according to the present invention, when mixed with cuprous oxide, is slight, indicating excellent storage stability of the coating resin of this invention.

The coating resin according to the present invention has no poisoning problem noted in use of the organotin copolymers, possesses excellent keeping quality and also shows a hydrolytic property comparable with the organotin-containing resins, so that the coating resin of this invention is capable of forming a coat which can maintain an excellent antifouling effect for a long period of time. Further, since the coating resin of this invention is soluble in the aromatic solvents, it is very useful for preparing an excellent antifouling paint.

What is claimed is:

1. An antifouling coating composition comprising:
   (a) a coating resin comprising a polymer obtained by polymerizing an unsaturated monomer of the following formula (I) alone or together with one or more other unsaturated monomers copolymerizable therewith:

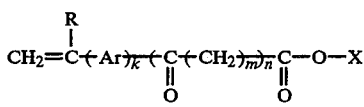  (I)

wherein R is a hydrogen atom or a straight or branched alkyl group having 1-4 carbon atoms; Ar is a benzene ring or naphthalene ring; k, m and n represent independently a number of 0 or 1; and X is a substituent selected from those represented by the following formulae:

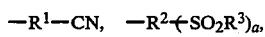

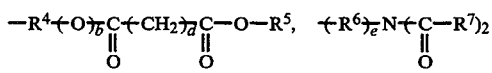

and 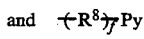

wherein $R^1$, $R^4$, $R^6$ and $R^8$ are each a straight, branched or alicyclic alkylene group having 1-6 carbon atoms; $R^2$ is a $C_{1-6}$ straight, branched or cyclic hydrocarbon group connecting O and $SO_2R^3$; a is an integer of 1 to 3 indicating the number of $SO_2R^3$ groups bonded to $R^2$; $R^3$ represents, independently when plural, a straight, branched or cyclic alkyl group, having 1-22 carbon atoms, an aryl group having 6-10 carbon atoms, which may have a substituent, or an aralkyl group having 7-18 carbon atoms, which may have a substituent, when a is 2 or 3, $R^3$'s may be the hydrocarbon groups forming a cyclic structure with each other; b, d, e and f are each a number of 0 or 1; $R^5$ is a straight or branched alkyl group having 1-4 carbon atoms, two $R^7$'s represent independently a straight, branched or alicyclic alkyl group, having 1-22 carbon atoms, an aryl group having 6-10 carbon atoms or an aralkyl group having 7-10 carbon atoms, or two $R^7$'s may combine to form a cyclic structure; and Py stands for a substituted or non-substituted 2-, 3- or 4- pyridyl group; and (b) an antifouling agent.

2. A composition according to claim 1, which further comprises:
   (c) one or more coloring matters.

3. A composition according to claim 1, wherein k and n in the formula (I) are zero.

4. A composition according to claim 1, wherein X in the formula (I) is $-R^1-CN$.

5. A composition according to claim 1, wherein X in the formula (I) is $-R^2(SO_2R^3)_a$.

6. A composition according to claim 1, wherein in the formula (I), X is $-R^1-CN$, and k and n are zero.

7. A composition according to claim 1, wherein in the formula (I), X is $-R^2(SO_2R^3)_a$, and k and n are zero.

8. A composition according to claim 1, wherein the antifouling agent is selected from the group consisting of zinc suboxide, zinc chromate, strontium chromate, cupric chromate, cupric ferrocyanate, cupric quinone, cupric δ-hydroquinone, cupric oleate, cupric nitrate, cupric phosphate, cupric tartrate, cuprous oxide, cuprous iodide and cuprous sulfite.

9. A process for coating on underwater or submarine structures as an antifouling paint, a resin comprising a polymer obtained by polymerizing an unsaturated monomer of the following formula (I) alone or together with one or more of other unsaturated monomers copolymerizable therewith:

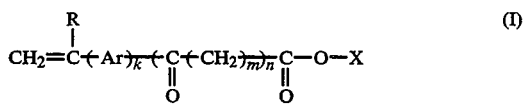  (I)

wherein R is a hydrogen atom or a straight or branched alkyl group having 1-4 carbon atoms; Ar is a benzene ring or naphthalene ring; k, m and n represent independently a number of 0 or 1; and X is a substituent selected from those represented by the following formulae:

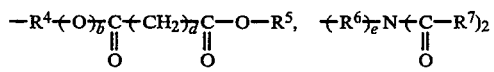

and 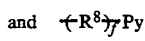

wherein $R^1$, $R^4$, $R^6$ and $R^8$ are each a straight, branched or alicyclic alkylene group having 1-6 carbon atoms; $R^2$ is a $C_{1-6}$ straight, branched or cyclic hydrocarbon group connecting O and $SO_2R^3$; a is an integer of 1 to 3 indicating the number of $SO_2R^3$ groups bonded to $R^2$; $R^3$ represents, independently when plural, a straight, branched or cyclic alkyl group, having 1-22 carbon atoms, an aryl group having 6-10 carbon atoms, which may have a substituent, or an aralkyl group having 7-18 carbon atoms, which may have a substituent, when a is 2 or 3, $R^3$'s may be the hydrocarbon groups forming a cyclic structure with each other; b, d, e and f are each a number of 0 or 1; $R^5$ is a straight or branched alkyl group having 1-4 carbon atoms, two $R^7$'s represent independently a straight, branched or alicyclic alkyl group, having 1-22 carbon atoms, an aryl group having 6-10 carbon atoms or an aralkyl group having 7-10 carbon atoms, or two $R^7$'s may combine to form a cyclic structure; and Py stands for a substituted or non-substituted 2-, 3- or 4- pyridyl group.

* * * * *